(12) United States Patent
Vishnumolakala et al.

(10) Patent No.: US 10,705,911 B2
(45) Date of Patent: Jul. 7, 2020

(54) STORING DATA IN A DISTRIBUTED STORAGE SYSTEM

(71) Applicant: HEWLETT PACKARD ENTERPRISE DEVELOPMENT LP, Houston, TX (US)

(72) Inventors: Murali Krishna Vishnumolakala, San Jose, CA (US); Umesh Maheshwari, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/847,585

(22) Filed: Dec. 19, 2017

(65) Prior Publication Data

US 2018/0307560 A1    Oct. 25, 2018

Related U.S. Application Data

(60) Provisional application No. 62/489,355, filed on Apr. 24, 2017.

(51) Int. Cl.
| | |
|---|---|
| *G06F 11/00* | (2006.01) |
| *G06F 11/10* | (2006.01) |
| *G06F 3/06* | (2006.01) |
| *G06F 11/20* | (2006.01) |

(52) U.S. Cl.
CPC .......... *G06F 11/1076* (2013.01); *G06F 3/061* (2013.01); *G06F 3/065* (2013.01); *G06F 3/067* (2013.01); *G06F 3/0619* (2013.01); *G06F 11/2094* (2013.01); *G06F 2201/85* (2013.01)

(58) Field of Classification Search
CPC ............... G06F 11/1076; G06F 11/108; G06F 11/1088; G06F 11/1092; G06F 11/1096

USPC .................................. 714/6.24, 6.2
See application file for complete search history.

(56) References Cited

U.S. PATENT DOCUMENTS

| | | |
|---|---|---|
| 5,761,402 A | 6/1998 | Kaneda et al. |
| 6,041,423 A | 3/2000 | Tsukerman |
| 8,316,260 B1 | 11/2012 | Bonwick |
| 8,463,991 B2 | 6/2013 | Colgrove et al. |
| 8,484,536 B1 * | 7/2013 | Cypher ............... G06F 11/1076 711/148 |
| 8,583,866 B2 | 11/2013 | Chambliss et al. |

(Continued)

OTHER PUBLICATIONS

Extended European Search Report received in EP Application No. 1863060.9, dated Nov. 22, 2018, 9 pages.

*Primary Examiner* — Sarai E Butler
(74) *Attorney, Agent, or Firm* — Hewlett Packard Enterprise Patent Department

(57) ABSTRACT

According to examples, a storage node may include storage devices and a controller that may determine whether all of a plurality of data chunks of a first intra-node portion of a stripe have been stored on the storage node. Based on a determination that all of the data chunks have been stored, a first intra-node parity chunk may be stored at a second one of the storage devices, in which the first intra-node parity chunk may be determined from at least one of the data chunks of the first intra-node portion. Based on a determination that at least one of the data chunks has not been stored, storage of a first intra-node parity chunk of the stripe on the storage node may be delayed until a determination is made that all of the data chunks of the first intra-node portion have been stored at the storage node.

20 Claims, 16 Drawing Sheets

(56) References Cited

U.S. PATENT DOCUMENTS

| | | | |
|---|---|---|---|
| 8,607,017 B2* | 12/2013 | Condict | G06F 3/0608 |
| | | | 711/170 |
| 8,612,680 B1* | 12/2013 | Madnani | G06F 12/0866 |
| | | | 711/113 |
| 8,689,042 B1* | 4/2014 | Kanapathippillai | ......... |
| | | | G06F 13/1657 |
| | | | 714/6.22 |
| 8,706,932 B1* | 4/2014 | Kanapathippillai | ......... |
| | | | G06F 13/1694 |
| | | | 710/62 |
| 2013/0055013 A1* | 2/2013 | Seki | G06F 11/1092 |
| | | | 714/6.24 |
| 2013/0226867 A1* | 8/2013 | Lee | G06F 16/1827 |
| | | | 707/610 |
| 2014/0136779 A1* | 5/2014 | Guha | G06F 9/5066 |
| | | | 711/114 |
| 2014/0380125 A1 | 12/2014 | Calder et al. | |
| 2017/0031751 A1* | 2/2017 | Baek | G06F 3/0688 |
| 2017/0255515 A1* | 9/2017 | Kim | G06F 3/0619 |
| 2018/0101441 A1* | 4/2018 | Hyun | G06F 3/0619 |
| 2018/0275898 A1* | 9/2018 | Bhansali | G06F 3/0608 |

\* cited by examiner

STORING DATA IN A DISTRIBUTED STORAGE SYSTEM

BACKGROUND

The use of data redundancy is common in storage systems, so that failure of one or more components of a storage system does not result in the permanent loss of data. Data redundancy, however, typically comes with some tradeoffs, such as increased reads and writes. For example, data is read in order for parity chunks to be computed, and further, the parity chunks are stored.

BRIEF DESCRIPTION OF THE DRAWINGS

Features of the present disclosure may illustrated by way of example and not limited in the following figure(s), in which like numerals indicate like elements, in which.

DETAILED DESCRIPTION

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may intended to denote at least one of a particular element. As used herein, the term "includes" means includes but not limited to, the term "including" means including but not limited to. The term "based on" means based at least in part on.

In the following detailed description, reference is made to the accompanying drawings that form a part hereof, and in which are shown by way of illustration specific examples of the present disclosure. It is understood that other examples may be utilized and structural changes may be made without departing from a scope of the present disclosure. Descriptions associated with any one of the figures may be applied to a different figure containing like or similar components/steps. While the flow diagrams each present a series of steps in a certain order, the order of the steps may be for one example and it is understood that the order of the steps may be different for other examples.

Described hereinbelow are techniques that may provide increased write efficiency when storing data in a redundant manner.

Figure 1:
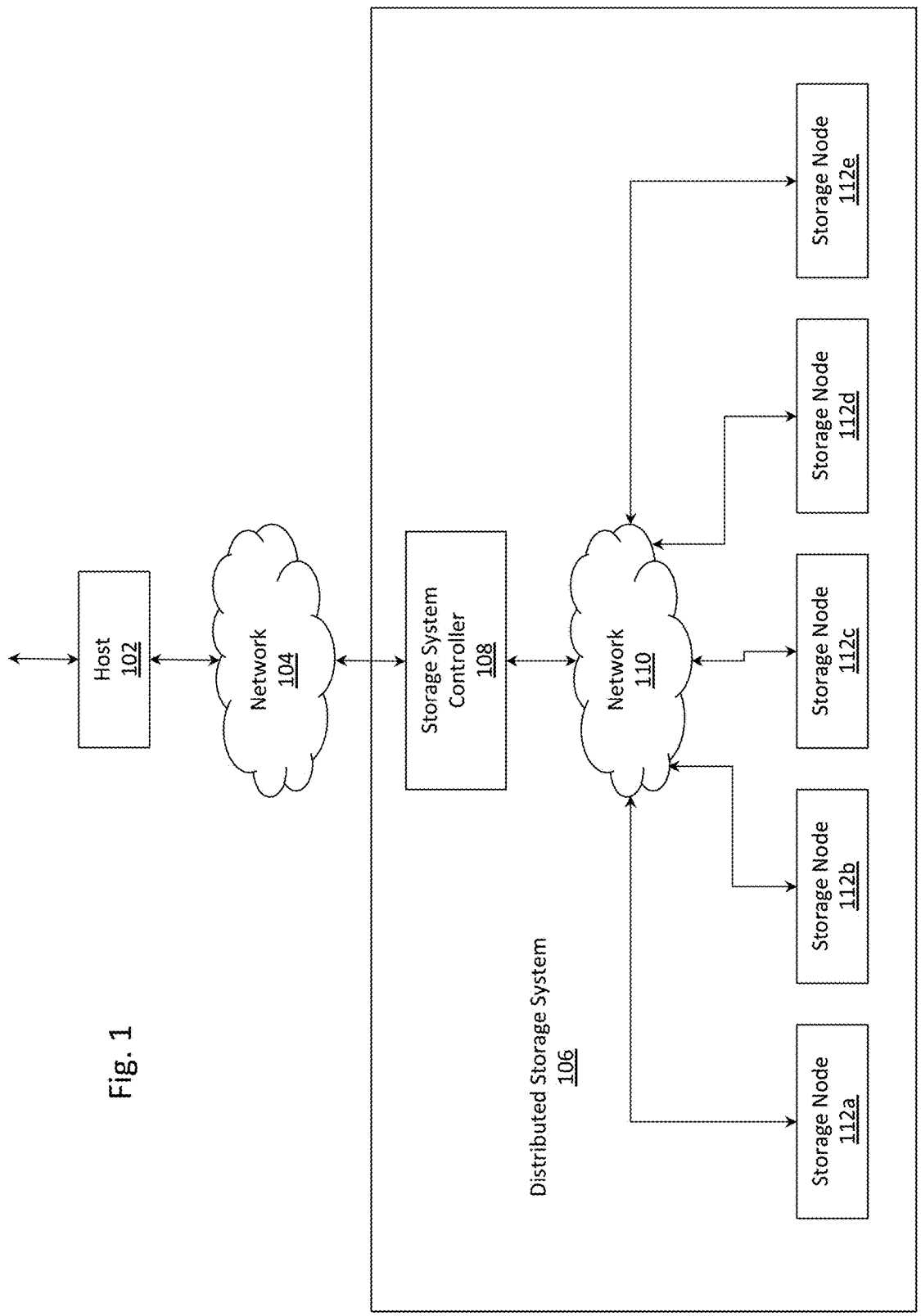
FIG. 1 depicts an example distributed storage system communicatively coupled to a host.

FIG. 1 depicts an example distributed storage system 106 communicatively coupled to a host 102 via a network 104. The host 102 may read data from the distributed storage system 106 and may write data to the distributed storage system 106.

The distributed storage system 106 may include a storage system controller 108 and a plurality of storage nodes (112a, . . . , 112e). The storage system controller 108 and the plurality of storage nodes (112a, . . . , 112e) may be communicatively coupled to one another via the network 110. The storage system controller 108 may receive read requests and write requests from the host 102. In response to receiving a read request, the storage system controller 108 may read data from one or more of the storage nodes (112a, . . . , 112e). In response to receiving a write request, the storage system controller 108 may write data to one or more of storage nodes (112a, . . . , 112e). The processing of read requests may described in FIGS. 9-10 below, and the processing of write requests may described in FIGS. 6-8 and 11-15 below.

As described below, the storage system controller 108 may store data on the storage nodes (112a, ..., 112e) in a redundant manner (e.g., using erasure coding or data mirroring), so that even if one or more of the storage nodes (112a, ..., 112e) were to fail, no data loss may occur. To allow for the redundant storage of data, the storage nodes (112a, ..., 112e) may operate independently of one another. That is, the failure of one or more of the storage nodes may not cause the failure of the remainder of the storage nodes (112a, ..., 112e).

The storage nodes (112a, ..., 112e) may be geographically distributed (e.g., distributed at geographically disparate locations). A consequence of the distributed nature of the storage nodes (112a, ..., 112e) may be an asymmetry between intra-node and inter-node data retrieval. In other words, a storage node 112a may read data from or write data to locally more quickly, than if the storage node 112a were to read data from or write data to a neighboring storage node 112b. Such asymmetry between intra-node and inter-node data retrieval may factor into the techniques for reading and writing data as described below.

The network 104 may include a LAN, WAN, MAN, wired or wireless network, private or public network, etc. A similar description may apply to the network 110. While five storage nodes (112a, ..., 112e) have been depicted, it is understood that a greater or fewer number of storage nodes (112a, ..., 112e) may be present in the distributed storage system 106. Further, while the storage system controller 108 is depicted as a component that is separate from each of the storage nodes (112a, ..., 112e), the storage system controller 108 may be instantiated within one or more of storage nodes (112a, ..., 112e). In the case that the storage system controller 108 may be instantiated within the storage node 112a and the storage node 112b, the storage node 112a may be known as a group leader and the storage node 112b may be known as a backup leader (or vice versa).

Figure 2:
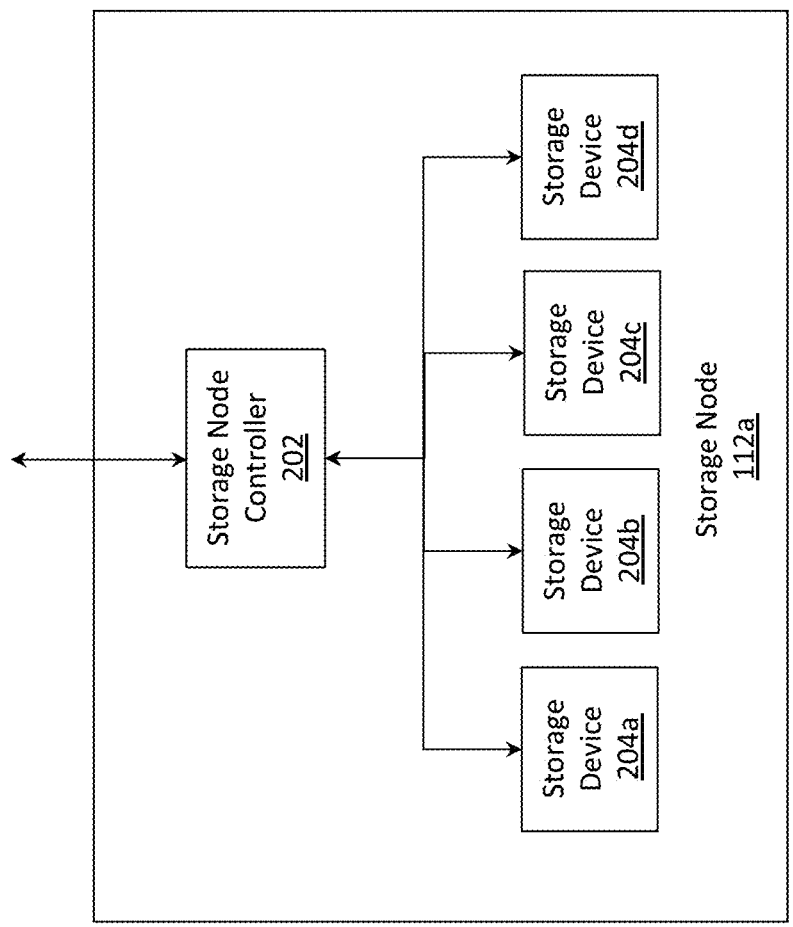
FIG. 2 depicts an example storage node.

FIG. 2 depicts further details of an example storage node 112a. The storage node 112a may include a storage node controller 202 communicatively coupled to a plurality of storage devices (204a, ... 204d). The storage node controller 202 may receive read requests and write requests from the storage system controller 108. In response to receipt of a read request, the storage node controller 202 may read data from one or more of the storage devices (204a, ... 204d). In response to receipt of a write request, the storage node controller 202 may write data to one or more of the storage devices (204a, ... 204d). The storage devices (204a, ... 204d) may include one or more hard disk drives (HDDs), solid state drives (SSDs), optical drives, etc.

As described below, the storage node controller 202 may store data in the storage devices (204a, ..., 204d) in a redundant manner, so that even if one or more of the storage devices (204a, ..., 204d) were to fail, no data loss may occur. To allow for the redundant storage of data, the storage devices (204a, ..., 204d) may operate independently of one another. That is, the failure of one or more of the storage devices may not cause the failure of the remainder of the storage devices. In contrast to the distributed nature of the distributed storage system 106, the components of a storage node 112a may be located at the same geographical location. In some examples, all of the storage devices (204a, ..., 204d) of a storage node 112a may be located within a single chassis. One consequence of such a physical arrangement may be that the storage node controller 202 may read data from and write data to the storage devices (204a, ... 204d) with minimal delay.

While one storage node controller 202 has been depicted in FIG. 2, it may be understood that one or more storage node controllers may be employed (e.g., in an active/standby arrangement). Further, while four storage devices (204a, ..., 204d) have been depicted, it may be understood that a greater or fewer number of storage devices (204a, ..., 204d) may be present. Further, it may be understood that the storage nodes 112b, ... 112e may contain similar components as storage node 112a.

Figure 3:
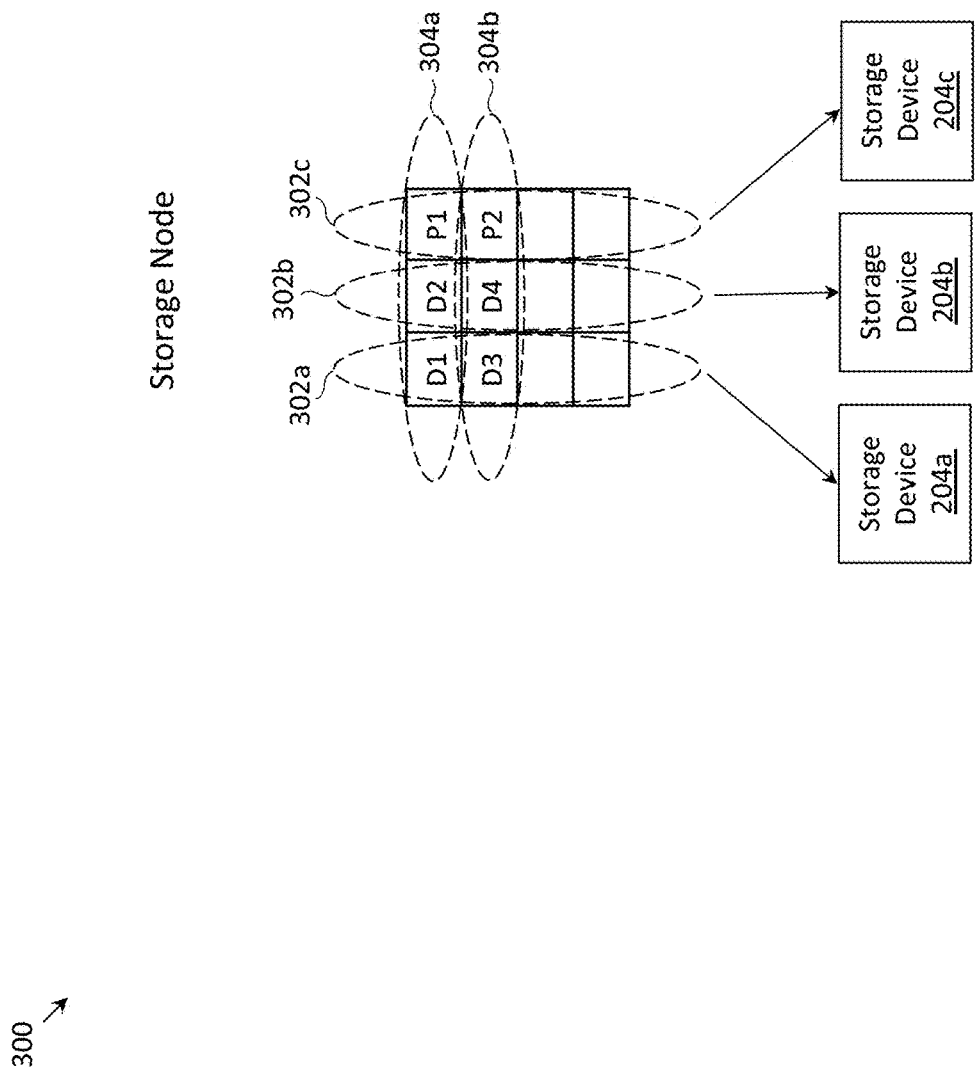
FIG. 3 depicts an example storage node in which D+P erasure coding may be employed.

FIG. 3 depicts an example storage node 300, in which D+P erasure coding may be employed. The storage node depicted in FIG. 3 may be any of the storage nodes (112a, ... 112e) depicted in FIG. 1. In a D+P erasure coding scheme, D data chunks and P parity chunks (or more generally, error correcting chunks) may be stored across D+P storage devices, and in the event that P or fewer of the storage devices fail, the remaining devices may be used to recover the D data chunks. Specifically, a 2+1 erasure coding scheme may be employed in the storage node 300 depicted in FIG. 3. Columns 302a, 302b and 302c may abstractly represent the data and/or parity chunks stored on the storage devices 204a, 204b and 204c, respectively. In the example of FIG. 3, the data chunks D1 and D3 may be stored on a first storage device 204a; data chunks D2 and D4 may be stored on a second storage device 204b; and parity chunks P1 and P2 may be stored on a third storage device 204c. The data chunks D1 and D2, and the parity chunk P1 may form a first logical stripe (or "stripe") 304a; and data chunks D3 and D4, and parity chunk P2 may form a second logical stripe 304b. The parity chunk P1 (e.g., bitwise XOR, etc.) may be computed from data chunks D1 and D2; and parity chunk P2 may be computed from data chunks D3 and D4 in any suitable manner. If the first storage device 204a were to fail, D2 and P1 may be used to recover D1; and D4 and P2 may be used to recover D3. The data chunks may be recovered through implementation of suitable specific computations (e.g., bitwise XOR, etc.).

In the example shown in FIG. 3, the first and second storage devices 204a and 204b may be dedicated to store data chunks and the third storage device 204c may be dedicated to store parity chunks, such as in a RAID 4 scheme. Nevertheless, it may be understood that other RAID configurations may be employed, such as RAID 5 (in which parity chunks are distributed across the storage devices), etc.

A data chunk may represent a binary string (e.g., "00001010") and a parity chunk may similarly represent a binary string (e.g., "01110001"). A data chunk may represent a temperature, a color, a portion of a video, a portion of an email, etc., whereas a parity chunk may encode information for recovering one or more data chunks in the event that a data chunk is corrupted, cannot be read, etc.

Figure 4:
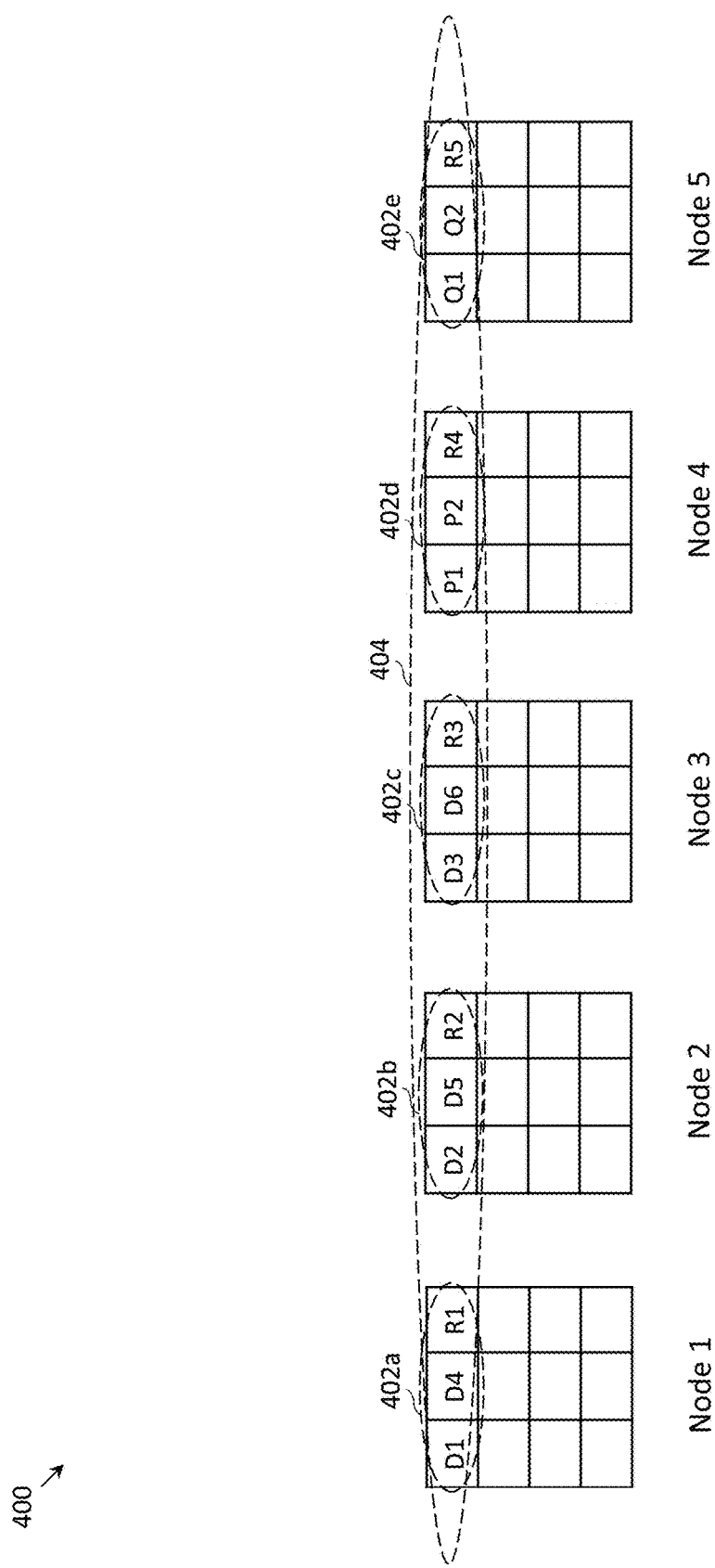
FIG. 4 depicts an example distributed storage system in which with $D_\alpha + P_\alpha$ erasure coding may be employed within each of the storage nodes and $D_\beta + P_\beta$ erasure coding may be employed across the storage nodes.

FIG. 4 depicts an example distributed storage system 400, in which $D_\alpha + P_\alpha$ erasure coding may be employed within each of the storage nodes and $D_\beta + P_\beta$ erasure coding may be employed across the storage nodes. More specifically, FIG. 4 depicts an example distributed storage system, in which 2+1 erasure coding may be employed within each of the storage nodes and 3+2 erasure coding may be employed across the storage nodes. The $D_\beta + P_\beta$ erasure coding employed across the storage nodes may provide the ability for data to be recovered in the event that an entire storage node experiences failure. For example, if nodes 1 and 2 were to fail, nodes 3, 4 and 5 may be used to recover the data on nodes 1 and 2.

In the example of FIG. 4, a stripe 404 includes intra-node portions 402a, 402b, 402c, 402d and 402e. In the context of FIG. 4, R1 may be called an "intra-node parity chunk" because R1 provides data redundancy for data chunks D1 and D4 (e.g., may provide data redundancy for data chunks within node 1). R2 and R3 may similarly be called intra-node parity chunks. P1 may be called an "inter-node parity chunk" because P1 provides data redundancy for the chunks D1, D2 and D3 (e.g., provides data redundancy for data chunks outside of node 4). Inter-node parity chunk Q1 similarly may provide data redundancy for data chunks D1, D2 and D3. Inter-node parity chunk P2 may provide data redundancy for data chunks D4, D5 and D6. Inter-node parity chunk Q2 similarly may provide data redundancy for data chunks D4, D5 and D6. R4 may also be called an "intra-node parity chunk" because R4 provides data redundancy for the inter-node parity chunks P1 and P2 (e.g., provides data redundancy for inter-node parity chunks within node 4). Intra-node parity chunk R5 similarly may provide data redundancy for inter-node parity chunks Q1 and Q2.

There may be certain considerations regarding inter-node parity and intra-node parity when data may to be recovered (e.g., a read request requests data on a storage device that has failed). Supposing that data chunk D1 were lost, according to examples, there may be a variety of ways to recover the data chunk D1. In a first approach, data chunk D1 may be recovered from data chunk D4 and R1. In a second approach, D1 may be recovered from D2, D3 and P1, and in a third approach, D1 may be recovered from D2, D3 and Q1. Due to network delays, the first approach may typically be preferred over the second and third approaches (e.g., intra-node parity may be used to recover data whenever possible, and inter-node parity may be used only if intra-node parity is not available).

There may also be certain considerations regarding inter-node parity and intra-node parity when data is stored. First, in a simplistic scheme, the write of every data chunk may require the updating (or write) of three intra-node parity chunks and two inter-node parity chunks. For instance, if data chunk D1 were modified (or stored), intra-node parity chunk R1 may need to be modified (or stored) because intra-node parity chunk R1 depends on data chunk D1. Inter-node parity chunks P1 and Q1 may also need to be modified (or stored) because inter-node parity chunks P1 and Q1 depend on data chunk D1. Further, intra-node parity chunks R4 and R5 may also need to be modified (or stored) because intra-node parity chunks R4 and R5 depend on inter-node parity chunks P1 and Q1, respectively. When storing new data (as opposed to modifying existing data), one approach to minimize the updating of parity chunks is to assemble an entire stripe in a buffer (e.g., a buffer located at storage system controller 108), and store the entire stripe across storage nodes 112a, . . . , 112e. However, in software-defined storage (SDS), such a write buffer may not be available. When storing data without a write buffer in the context of FIG. 4, several procedures for storing data may be possible. A less efficient scheme will be described in FIG. 6, followed by two more efficient schemes in FIGS. 7 and 8.

Figure 5:
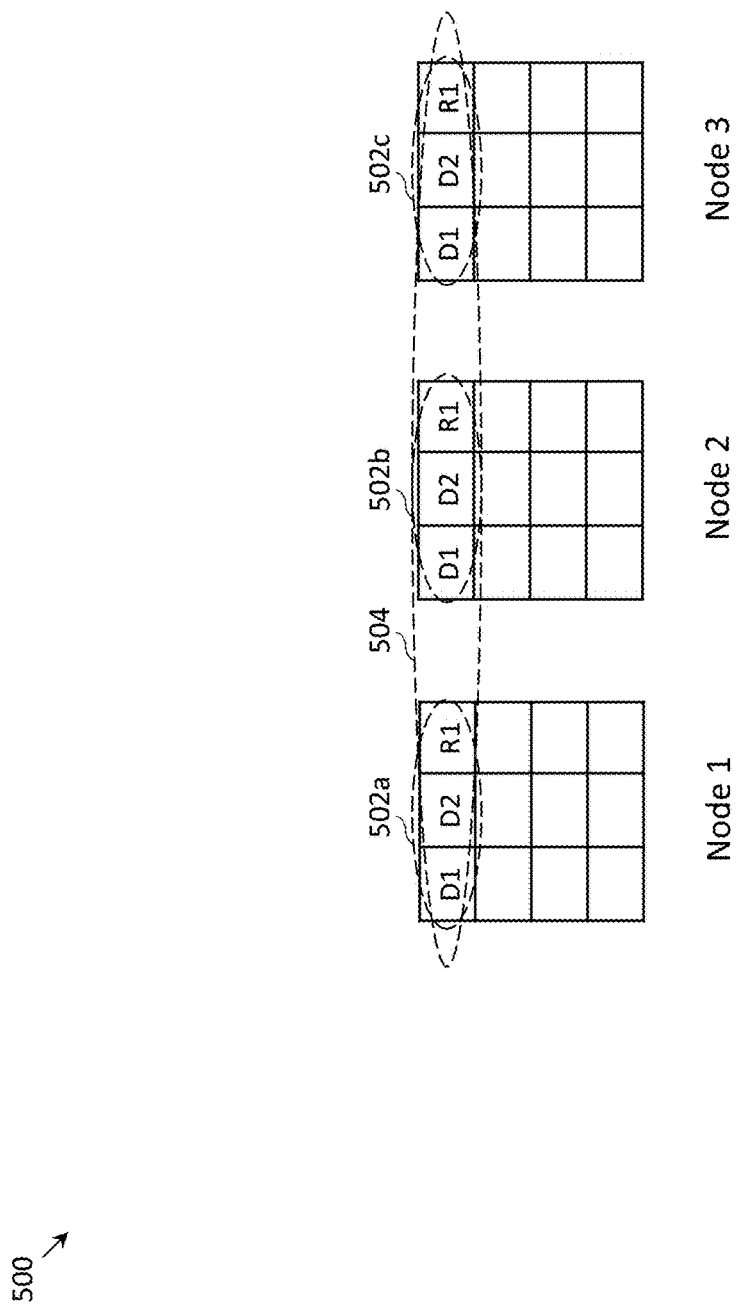
FIG. 5 depicts an example distributed storage system in which D+P erasure coding may be employed within each of the storage nodes and mirroring may be employed across the storage nodes.

FIG. 5 depicts an example distributed storage system 500, in which D+P erasure coding may be employed within each of the storage nodes and mirroring may be employed across the storage nodes. More specifically, FIG. 5 depicts an example distributed storage system 500 in which 2+1 erasure coding may be employed within each of the storage nodes and three-way mirroring may be employed across the storage nodes. The three-way mirroring across the storage nodes may provide the ability for data to be recovered in the event that an entire node experiences failure. For example, if node 1 and/or node 2 were to fail, node 3 may be used to recover the data on nodes 1 and/or 2.

In the example of FIG. 5, a stripe 504 includes intra-node portions 502a, 502b and 502c. Intra-node portions 502a, 502b and 502c may be identical to one another in the three-way mirroring scheme. In the context of FIG. 5, R1 may be called an "intra-node parity chunk", because R1 provides data redundancy for data chunks D1 and D2 (i.e., provides data redundancy for the data chunks within node 1).

There may be certain considerations regarding data mirroring and intra-node parity when data is to be recovered (e.g., a read request requests data on a storage device that has failed). Supposing that data chunk D1 on node 1 were lost, there may be a variety of ways to recover D1. In a first approach, D1 on node 1 may be recovered from D2 and R1 on node 1. In a second approach, D1 on node 1 may be recovered from D1 on node 2 or D1 on node 3. Due to network delays, the first approach may typically be preferred over the second approach (i.e., use intra-node parity whenever possible to recover data, and use mirrored data if intra-node parity is not available).

There may also be certain considerations regarding inter-node parity and intra-node parity when data is stored. First, in a simplistic scheme, the storing of every data chunk may require the updating (or write) of three data chunks and three intra-node parity chunks. For instance, if data chunk D1 were modified (or stored), data chunk D1 and intra-node parity R1 may need to be stored on nodes 1, 2 and 3. When writing new data (as opposed to modifying existing data), one approach to minimize the updating of parity chunks may be to assemble an entire stripe in a buffer (e.g., a buffer located at storage system controller 108), and store the entire stripe across storage nodes 112a, . . . , 112e. However, in software-defined storage (SDS), such a write buffer may not be available. When storing data without a write buffer in the context of FIG. 5, several procedures for storing data may be possible. A less efficient scheme will be described in FIG. 11, followed by a more efficient scheme in FIG. 12.

Figure 6:
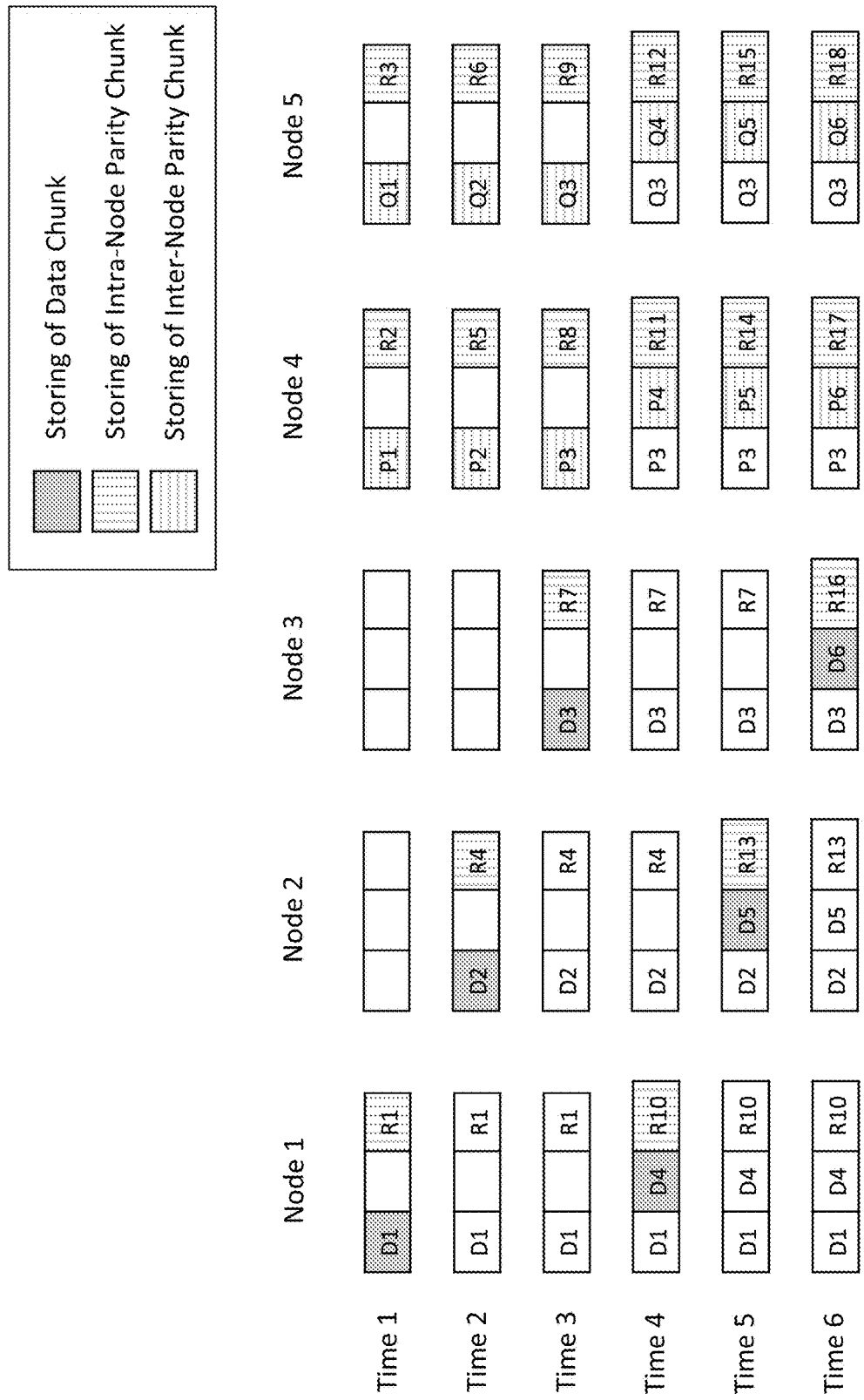
FIG. 6 depicts an example storing process of a stripe in the distributed storage system of FIG. 4, in which inter-node parity chunks and intra-node parity chunks may both be stored synchronously.

FIG. 6 depicts an example storing process of a stripe in the distributed storage system of FIG. 4, in which inter-node parity chunks and intra-node parity chunks may both be stored synchronously. In particular, FIG. 6 describes an example storing process of a stripe including six data chunks, and the six data chunks may be stored over six time instances (e.g., in a software-defined storage environment). For ease of illustration, only one "row" of the distributed storage system is depicted, but it is understood that other rows may be present (as in FIG. 4).

At a first time instance (or time period), data chunk D1 of the stripe may be stored at node 1. In the synchronous write of intra-node parity chunks, intra-node parity chunks R1, R2 and R3 may also be stored at the first time instance. In the synchronous write of inter-node parity chunks, inter-node parity chunks P1 and Q1 may also be stored at the first time instance. As explained above, intra-node parity chunk R1 may provide data redundancy for data chunk D1; inter-node parity chunks P1 and Q1 may provide data redundancy for data chunk D1; and intra-node parity chunks R2 and R3 may provide data redundancy for inter-node parity chunks P1 and Q1, respectively.

At a second time instance (or time period), data chunk D2 of the stripe may be stored at node 2. In the synchronous write of intra-node parity chunks, intra-node parity chunks R4, R5 and R6 may also be stored at the second time instance. In the synchronous write of inter-node parity chunks, inter-node parity chunks P2 and Q2 may also be stored at the second time instance. Intra-node parity chunk R4 may provide data redundancy for data chunk D2; inter-node parity chunks P2 and Q2 may provide data redundancy for data chunks D1 and D2; and intra-node parity chunks R5 and R6 may provide data redundancy for inter-node parity chunks P2 and Q2, respectively.

At a third time instance (or time period), data chunk D3 of the stripe may be stored at node 3. In the synchronous write of intra-node parity chunks, intra-node parity chunks R7, R8 and R9 may also be stored at the third time instance. In the synchronous write of inter-node parity chunks, inter-node parity chunks P3 and Q3 may also be stored at the third time instance. Intra-node parity chunk R7 may provide data redundancy for data chunk D3; inter-node parity chunks P3 and Q3 may provide data redundancy for data chunks D1, D2 and D3; and intra-node parity chunks R8 and R9 may provide data redundancy for inter-node parity chunks P3 and Q3, respectively.

At a fourth time instance (or time period), data chunk D4 of the stripe may be stored at node 1. In the synchronous write of intra-node parity chunks, intra-node parity chunks R10, R11 and R12 may also be stored at the fourth time instance. In the synchronous write of inter-node parity chunks, inter-node parity chunks P4 and Q4 may also be stored at the fourth time instance. Intra-node parity chunk R10 may provide data redundancy for data chunks D1 and D4; inter-node parity chunks P4 and Q4 may provide data redundancy for data chunk D4; intra-node parity chunk R11 may provide data redundancy for inter-node parity chunks P3 and P4; and intra-node parity chunk R12 may provide data redundancy for inter-node parity chunks Q3 and Q4.

At a fifth time instance (or time period), data chunk D5 of the stripe may be stored at node 2. In the synchronous write of intra-node parity chunks, intra-node parity chunks R13, R14 and R15 may also be stored at the fifth time instance. In the synchronous write of inter-node parity chunks, inter-node parity chunks P5 and Q5 may also be stored at the fifth time instance. Intra-node parity chunk R13 may provide data redundancy for data chunks D2 and D5; inter-node parity chunks P5 and Q5 may provide data redundancy for data chunks D4 and D5; intra-node parity chunk R14 may provide data redundancy for inter-node parity chunks P3 and P5; and intra-node parity chunk R15 may provide data redundancy for inter-node parity chunks Q3 and Q5.

At a sixth time instance (or time period), data chunk D6 of the stripe may be stored at node 3. In the synchronous write of intra-node parity chunks, intra-node parity chunks R16, R17 and R18 may also be stored at the sixth time instance. In the synchronous write of inter-node parity chunks, inter-node parity chunks P6 and Q6 may also be stored at the sixth time instance. Intra-node parity chunk R16 may provide data redundancy for data chunks D3 and D6; inter-node parity chunks P6 and Q6 may provide data redundancy for data chunks D4, D5 and D6; intra-node parity chunk R17 may provide data redundancy for inter-node parity chunks P3 and P6; and intra-node parity chunk R18 may provide data redundancy for inter-node parity chunks Q3 and Q6.

In summary, the writing procedure with synchronous intra-node parity writes and synchronous inter-node parity writes included the writing of sixteen intra-node parity chunks and twelve inter-node parity chunks (for the sequential writing of six data chunks). It may be noted that metadata may be stored with each inter-node parity chunk, which indicates the nodes for which the inter-node parity chunk provides data redundancy. For instance, the metadata may indicate node 1 for inter-node parity chunk P1; nodes 1 and 2 for inter-node parity chunk P2; nodes 1, 2 and 3 for inter-node parity chunk P3; and so on. Such metadata may be used during the recovery of data to reduce the reading of data. For instance, if data chunk D1 were to be recovered from inter-parity chunk P1 during the first time instance (assuming that intra-node parity chunk R1 were also lost), storage system controller 108 may avoid reading data from nodes 2 and 3, since the metadata would indicate that P1 only provides data redundancy for node 1. As another example, if data chunk D2 were to be recovered from inter-parity chunk P2 during the second time instance (assuming that intra-node parity chunk R4 were also lost), storage system controller 108 may avoid reading data from node 3, since the metadata would indicate that P2 only provides data redundancy for nodes 1 and 2.

Figure 7:
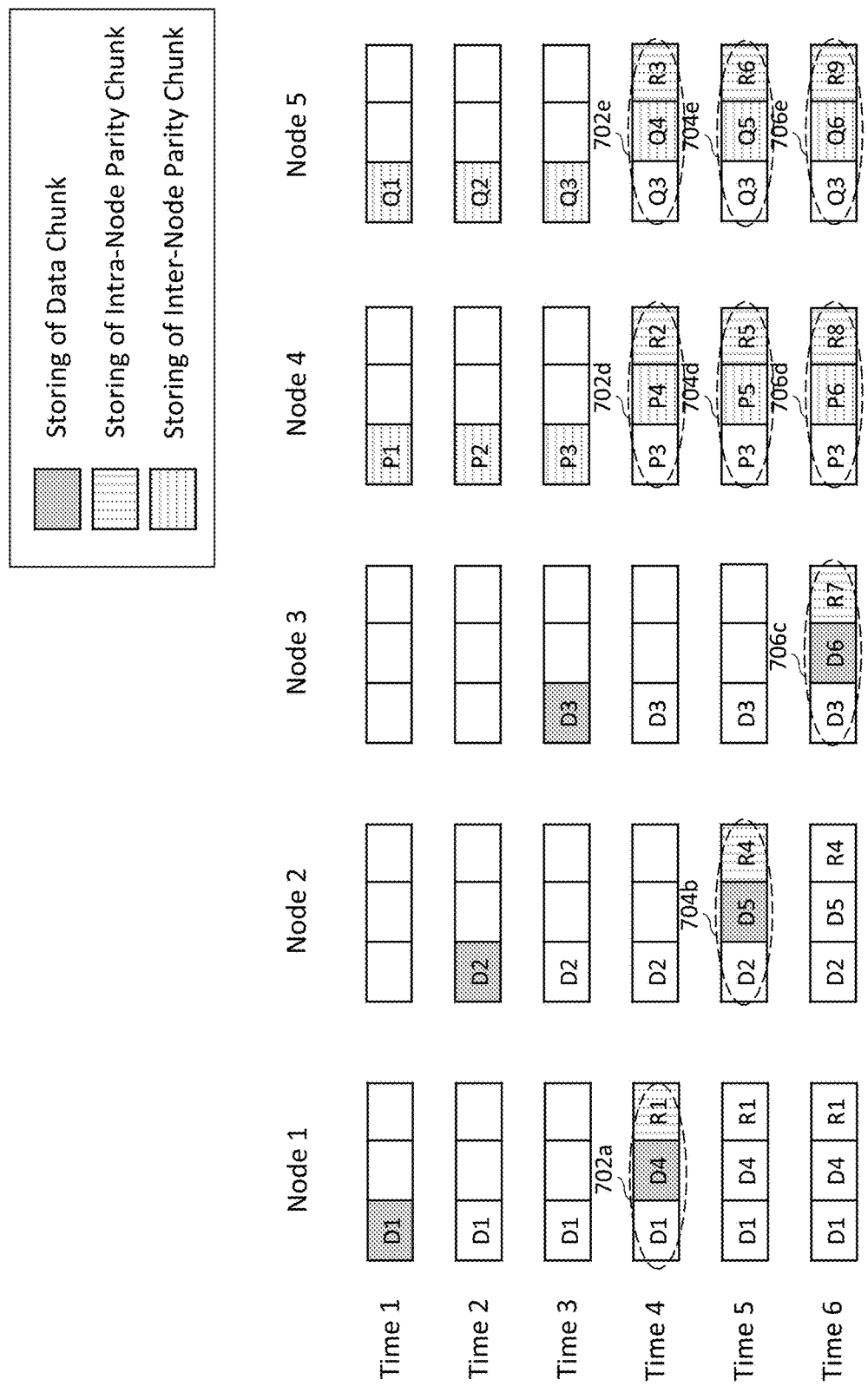
FIG. 7 depicts an example storing process of a stripe in the distributed storage system of FIG. 4, in which inter-node parity chunks may be stored synchronously and intra-node parity chunks may be stored asynchronously (e.g., following the storing of all data chunks belonging to an intra-node portion of a stripe).

FIG. 7 depicts an example storing process of a stripe in the distributed storage system depicted in FIG. 4, in which inter-node parity chunks may be stored synchronously and intra-node parity chunks may be stored asynchronously. More specifically, for each node, intra-node parity chunks may only be stored on that node at (or after) the time instance when all data chunks (or when all inter-node parity chunks) belonging to an intra-node portion of the stripe have been stored on that node. Initially, while data chunks of the stripe are being stored, read efficiency may be reduced for improved write efficiency. In this initial period when an intra-node parity chunk has not yet been stored at at least some of the nodes, some data recovery may include the reading of inter-node parity chunks, which may incur a greater network penalty (i.e., more network hops) than if the data could be recovered using intra-node parity. However, the writing of data during this initial period may be more efficient as fewer intra-node parity chunks may need to be computed and stored.

Such a scheme is described in more detail below, by way of an example in which a stripe including six data chunks may be stored. At a first time instance (or time period), data chunk D1 of the stripe may be stored at node 1. In an asynchronous write of intra-node parity chunks, no intra-node parity chunks may be stored at the first time instance. In the synchronous write of inter-node parity chunks, inter-node parity chunks P1 and Q1, may also be stored at the first time instance. Inter-node parity chunks P1 and Q1 may provide data redundancy for data chunk D1.

At a second time instance (or time period), data chunk D2 of the stripe may be stored at node 2. In an asynchronous write of intra-node parity chunks, no intra-node parity chunks may be stored at the second time instance. In the synchronous write of inter-node parity chunks, inter-node parity chunks P2 and Q2 may also be stored at the second time instance. Inter-node parity chunks P2 and Q2 may provide data redundancy for data chunks D1 and D2.

At a third time instance (or time period), data chunk D3 of the stripe may be stored at node 3. In an asynchronous write of intra-node parity chunks, no intra-node parity chunks may be stored at the third time instance. In the synchronous write of inter-node parity chunks, inter-node parity chunks P3 and Q3 may also be stored at the third time instance. Inter-node parity chunks P3 and Q3 may provide data redundancy for data chunks D1, D2 and D3.

At a fourth time instance (or time period), data chunk D4 of the stripe may be stored at node 1. In the asynchronous write of intra-node parity chunks (specific to the example of FIG. 7), intra-node parity chunks R1, R2 and R3 may also be stored at the fourth time instance. In the synchronous write of inter-node parity chunks, inter-node parity chunks P4 and Q4 may also be stored at the fourth time instance. More specifically, intra-node parity chunk R1 was stored in response to all data chunks of intra-node portion 702a being stored on node 1; intra-node parity chunk R2 was stored in response to all inter-node parity chunks of intra-node portion 702d being stored on node 4; and intra-node parity chunk R3 was stored in response to all inter-node parity chunks of intra-node portion 702e being stored on node 5. Intra-node parity chunk R1 may provide data redundancy for data chunks D1 and D4; inter-node parity chunks P4 and Q4 may provide data redundancy for data chunk D4; intra-node parity chunk R2 may provide data redundancy for inter-node parity chunks P3 and P4; and intra-node parity chunk R3 may provide data redundancy for inter-node parity chunks Q3 and Q4.

At a fifth time instance (or time period), data chunk D5 of the stripe may be stored at node 2. In the asynchronous write of intra-node parity chunks (specific to the embodiment of FIG. 7), intra-node parity chunks R4, R5 and R6 may also be stored at the fifth time instance. In the synchronous write of inter-node parity chunks, inter-node parity chunks P5 and Q5 may also be stored at the fifth time instance. More specifically, intra-node parity chunk R4 was stored in response to all data chunks of intra-node portion 704b being stored on node 2; intra-node parity chunk R5 was stored in response to all inter-node parity chunks of intra-node portion 704d being stored on node 4; and intra-node parity chunk R6 was stored in response to all inter-node parity chunks of intra-node portion 704e being stored on node 5. Intra-node parity chunk R4 may provide data redundancy for data chunks D2 and D5; inter-node parity chunks P5 and Q5 may provide data redundancy for data chunks D4 and D5; intra-node parity chunk R5 may provide data redundancy for inter-node parity chunks P3 and P5; and intra-node parity chunk R6 may provide data redundancy for inter-node parity chunks Q3 and Q5.

At a sixth time instance (or time period), data chunk D6 of the stripe may be stored at node 3. In the asynchronous write of intra-node parity chunks (specific to the embodiment of FIG. 7), intra-node parity chunks R7, R8 and R9 may also be stored at the sixth time instance. In the synchronous write of inter-node parity chunks, inter-node parity chunks P6 and Q6 may also be stored at the sixth time instance. More specifically, intra-node parity chunk R7 was stored in response to all data chunks of intra-node portion 706c being stored on node 3; intra-node parity chunk R8 was stored in response to all inter-node parity chunks of intra-node portion 706d being stored on node 4; and intra-node parity chunk R9 was stored in response to all inter-node parity chunks of intra-node portion 706e being stored on node 5. Intra-node parity chunk R7 may provide data redundancy for data chunks D3 and D6; inter-node parity chunks P6 and Q6 may provide data redundancy for data chunks D4, D5 and D6; intra-node parity chunk R8 may provide data redundancy for inter-node parity chunks P3 and P6; and intra-node parity chunk R9 may provide data redundancy for inter-node parity chunks Q3 and Q6.

In summary, the writing procedure described in FIG. 7 with asynchronous intra-node parity writes and synchronous inter-node parity writes included the writing of nine intra-node parity chunks and twelve inter-node parity chunks (for the sequential writing of six data chunks). In comparison with the writing procedure described in FIG. 6, the writing procedure described in FIG. 7 may provide a 50% reduction in the writing of intra-node parity chunks (calculated as 9 fewer intra-node parity chunks divided by 18 original intra-node parity chunks). Such efficiency may especially be beneficial if SSDs are used to store data, as the write amplification (i.e., the total number of data and parity chunks stored divided by the total number of data chunks stored) will be reduced (with write amplification being an important metric for SSDs). Similar to the writing procedure described in FIG. 6, metadata may be stored with each inter-node parity chunk which indicates the nodes for which the inter-node parity chunk provides data redundancy.

Figure 8:
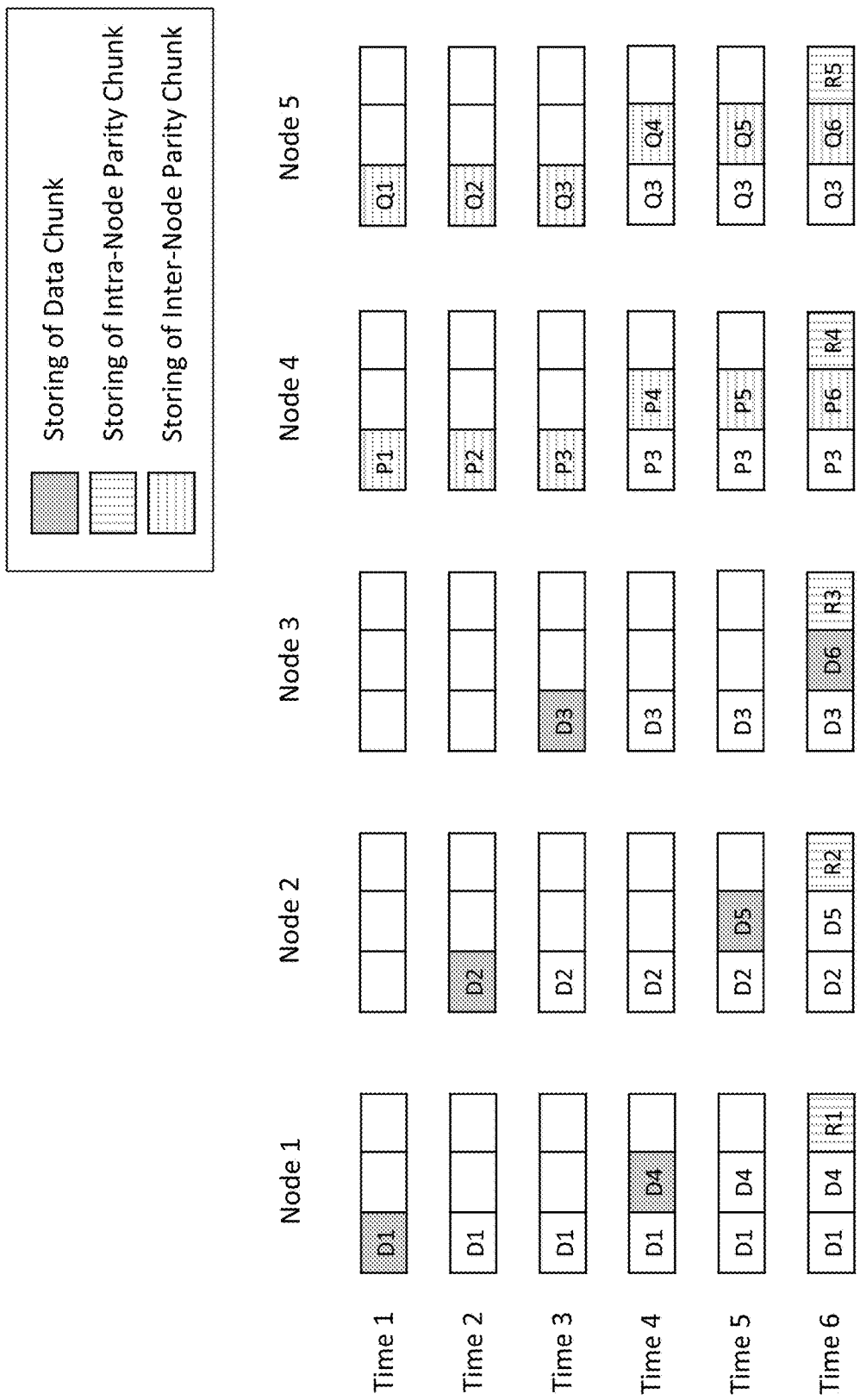
FIG. 8 depicts an example storing process of a stripe in the distributed storage system of FIG. 4, in which inter-node parity chunks may be stored synchronously and intra-node parity chunks may be stored asynchronously (e.g., following the storing of all data chunks belonging to a stripe).

FIG. 8 depicts an example storing process of a stripe in the distributed storage system depicted in FIG. 4, in which inter-node parity chunks may be stored synchronously and intra-node parity chunks may be stored asynchronously. More specifically, intra-node parity chunks may only be stored at (or after) the time instance when all data chunks belonging to the stripe have been stored. Initially while data chunks of the stripe are being stored, read efficiency may be reduced for improved write efficiency. In this initial period when intra-node parity may not be stored, any data recovery may include the reading of inter-node parity chunks, which may incur a greater network penalty (i.e., more network hops) than if the data could be recovered using intra-node parity. However, the writing of data during this initial period may be more efficient as no intra-node parity chunks may need to be computed and stored.

Such a scheme is described in more detail below, by way of an example in which a stripe including six data chunks may be stored. At a first time instance (or time period), data chunk D1 of the stripe may be stored at node 1. In an asynchronous write of intra-node parity chunks, no intra-node parity chunks may be stored at the first time instance. In the synchronous write of inter-node parity chunks, inter-node parity chunks P1 and Q1 may also be stored at the first time instance. Inter-node parity chunks P1 and Q1 provide data redundancy for data chunk D1.

At a second time instance (or time period), data chunk D2 of the stripe may be stored at node 2. In an asynchronous write of intra-node parity chunks, no intra-node parity chunks may be stored at the second time instance. In the synchronous write of inter-node parity chunks, inter-node parity chunks P2 and Q2 may also be stored at the second time instance. Inter-node parity chunks P2 and Q2 may provide data redundancy for data chunks D1 and D2.

At a third time instance (or time period), data chunk D3 of the stripe may be stored at node 3. In an asynchronous write of intra-node parity chunks, no intra-node parity chunks may be stored at the third time instance. In the synchronous write of inter-node parity chunks, inter-node parity chunks P3 and Q3 may also be stored at the third time instance. Inter-node parity chunks P3 and Q3 may provide data redundancy for data chunks D1, D2 and D3.

At a fourth time instance (or time period), data chunk D4 of the stripe may be stored at node 1. In the asynchronous write of intra-node parity chunks (specific to the example of FIG. 8), no intra-node parity chunks may be stored at the fourth time instance. In the synchronous write of inter-node parity chunks, inter-node parity chunks P4 and Q4 may also be stored at the fourth time instance. Inter-node parity chunks P4 and Q4 may provide data redundancy for data chunk D4.

At a fifth time instance (or time period), data chunk D5 of the stripe may be stored at node 2. In the asynchronous write of intra-node parity chunks (specific to the example of FIG. 8), no intra-node parity chunks may be stored at the fifth time instance. In the synchronous write of inter-node parity chunks, inter-node parity chunks P5 and Q5 may also be stored at the fifth time instance. Inter-node parity chunks P5 and Q5 may provide data redundancy for data chunks D4 and D5.

At a sixth time instance (or time period), data chunk D6 of the stripe may be stored at node 3. In the synchronous write of inter-node parity chunks, inter-node parity chunks P6 and Q6 may also be stored at the sixth time instance. With the storing of data chunk D6, all of the data chunks of the stripe may now be stored on the distributed storage system. In response to all of the data chunks of the stripe being stored, intra-node parity chunks R1, R2, R3, R4 and R5 may be stored. Intra-node parity chunk R1 may provide data redundancy for data chunks D1 and D4; intra-node parity chunk R2 may provide data redundancy for data chunks D2 and D5; intra-node parity chunk R3 may provide data redundancy for data chunks D3 and D6; intra-node parity chunk R4 may provide data redundancy for inter-node parity chunks P3 and P6; and intra-node parity chunk R5 may provide data redundancy for inter-node parity chunks Q3 and Q6.

In summary, the writing procedure described in FIG. 8 with asynchronous intra-node parity writes and synchronous inter-node parity writes included the writing of five intra-node parity chunks and twelve inter-node parity chunks (for the sequential writing of six data chunks). In comparison with the writing procedure described in FIG. 6, the writing procedure described in FIG. 7 may provide a 72% reduction in the writing of intra-node parity chunks (calculated as 13 fewer intra-node parity chunks divided by 18 original intra-node parity chunks). As mentioned above with respect to FIG. 7, such efficiency may especially be beneficial if SSDs are used to store data, as the write amplification will be reduced. Similar to the writing procedures described in FIGS. 6 and 7, each inter-node parity chunk may include metadata that indicates the nodes for which the inter-node parity chunk provides data redundancy.

Figure 9:
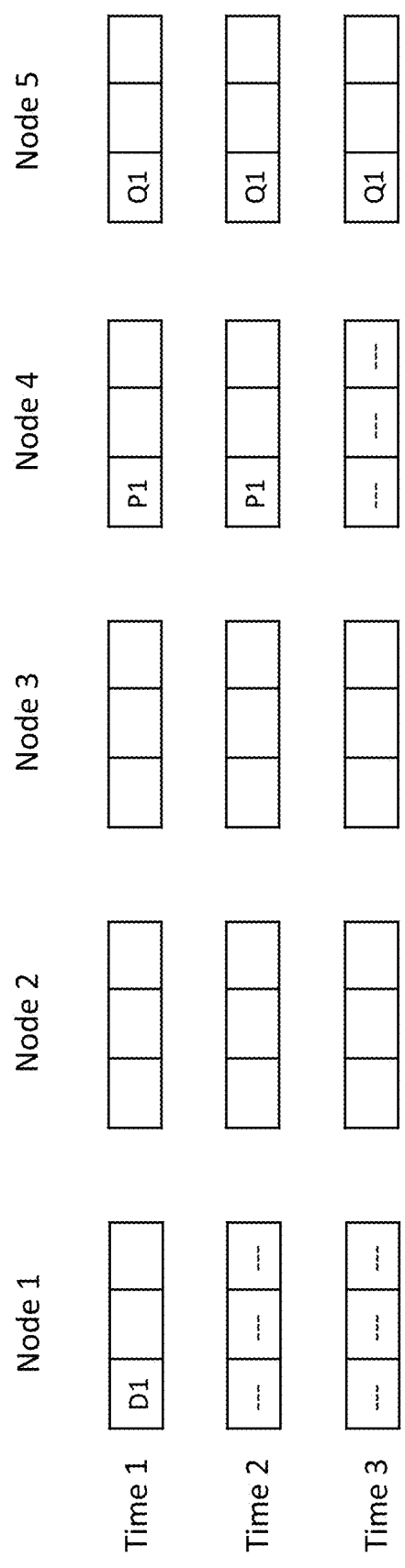
FIG. 9 depicts an example reading process of data from the distributed storage system of FIG. 4, following the failure of one or two of the storage nodes.

FIG. 9 depicts an example reading process of data from the distributed storage system depicted in FIG. 4, following the failure of one or two of the storage nodes. At a first time instance, data chunk D1 may be stored at node 1 and inter-node parity chunks P1 and Q1 may be stored at nodes 4 and 5, respectively. At a second time instance, assume that node 1 fails. If a read request requests data chunk D1, inter-node parity chunk P1 may be read. As described above, inter-node parity chunk P1 may contain metadata that records the nodes for which P1 provides data protection. In this example, the metadata of P1 may record node 1. As such, D1 may be reconstructed from P1 without any data being read from nodes 2 and 3.

At a third time instance, assume that both nodes 1 and 4 fail. If a read request requests data chunk D1, inter-node parity chunk Q1 may be read. Similar to the description of inter-node parity chunk P1 above, inter-node parity chunk Q1 may contain metadata that records the nodes for which Q1 provides data protection. In this example, the metadata of Q1 may record node 1. As such, D1 can be reconstructed from Q1 without any data being read from nodes 2 and 3.

Figure 10:
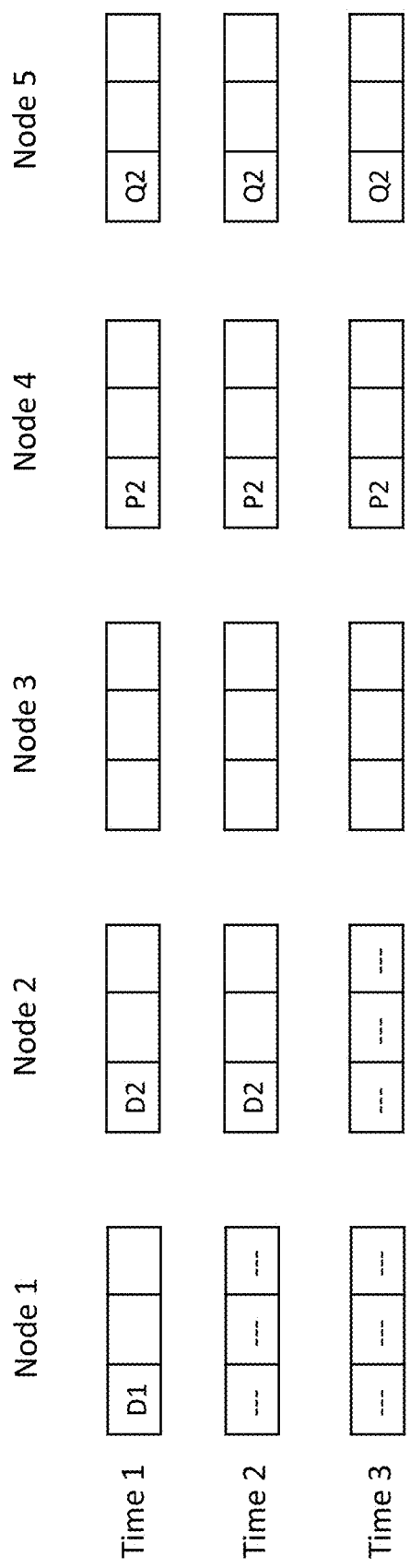
FIG. 10 depicts an example reading process of data from the distributed storage system of FIG. 4, following the failure of one or two of the storage nodes.

FIG. 10 depicts a reading process of data from the distributed storage system shown in FIG. 4, following the failure of one or two of the storage nodes. At a first time instance, data chunks D1 and D2 may be stored at nodes 1 and 2, respectively; and inter-node parity chunks P2 and Q2 may be stored at nodes 4 and 5, respectively. At a second time instance, assume that node 1 fails. If a read request requests data chunk D1, inter-node parity chunk P2 and data chunk D2 may be read to reconstruct data chunk D1. As described above, inter-node parity chunk P2 may contain metadata that records the nodes for which P2 provides data protection. In this example, the metadata of P2 may record nodes 1 and 2. As such, D1 may be reconstructed from D2 and P2 without any data being read from node 3.

At a third time instance, assume that both nodes 1 and 2 fail. If a read request requests data chunk D1, inter-node parity chunks P2 and Q2 may be read. Inter-node parity chunks P2 and Q2 may each contain metadata that records the nodes for which the respective inter-node parity chunk provides data protection. In this example, the metadata of P2 and Q2 may each record nodes 1 and 2. As such, D1 can be reconstructed from P2 and Q2 without any data being read from node 3.

Figure 11:
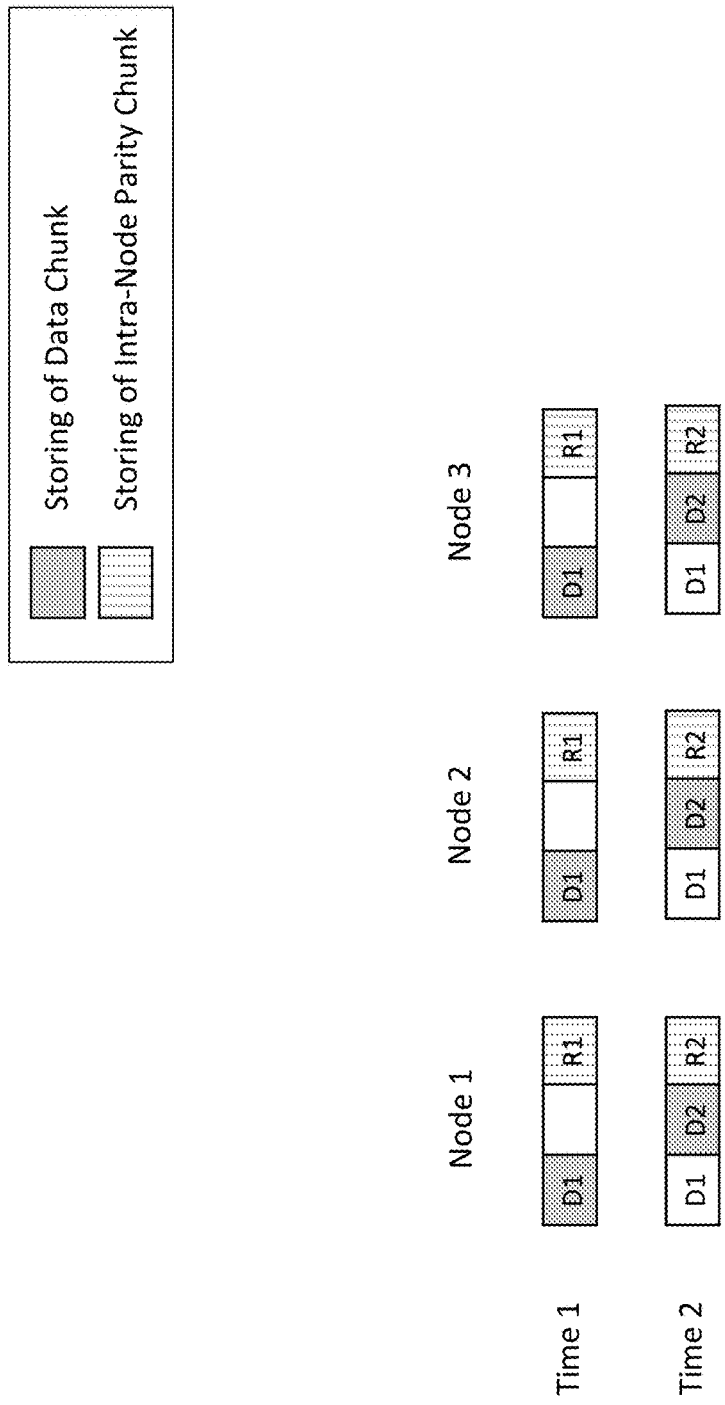
FIG. 11 depicts an example storing process of a stripe in the distributed storage system of FIG. 5, in which intra-node parity chunks may be stored synchronously.

FIG. 11 depicts an example storing process of a stripe in the distributed storage system of FIG. 5, in which intra-node parity chunks may be stored synchronously. As described above, the distributed storage system of FIG. 5 employs 2+1 erasure coding within storage nodes and three-way mirroring across the storage nodes. As shown in FIG. 11, data chunk D1 of the stripe may be stored at a first time instance (or first time period) on each of the nodes. In the synchronous write of intra-node parity chunks, intra-node parity chunk R1 may also be stored on each of the nodes at the first time instance. Intra-node parity chunk R1 may provide data redundancy for data chunk D1.

At a second time instance, data chunk D2 of the stripe may be stored on each of the nodes. In the synchronous write of intra-node parity chunks, intra-node parity chunk R2 may also be stored on each of the nodes at the second time instance. Intra-node parity chunk R2 may provide data redundancy for data chunks D1 and D2. In summary, the writing procedure described in FIG. 11 with synchronous intra-node parity writes included the writing of six intra-node parity chunks (for the sequential writing of two data chunks).

Figure 12:
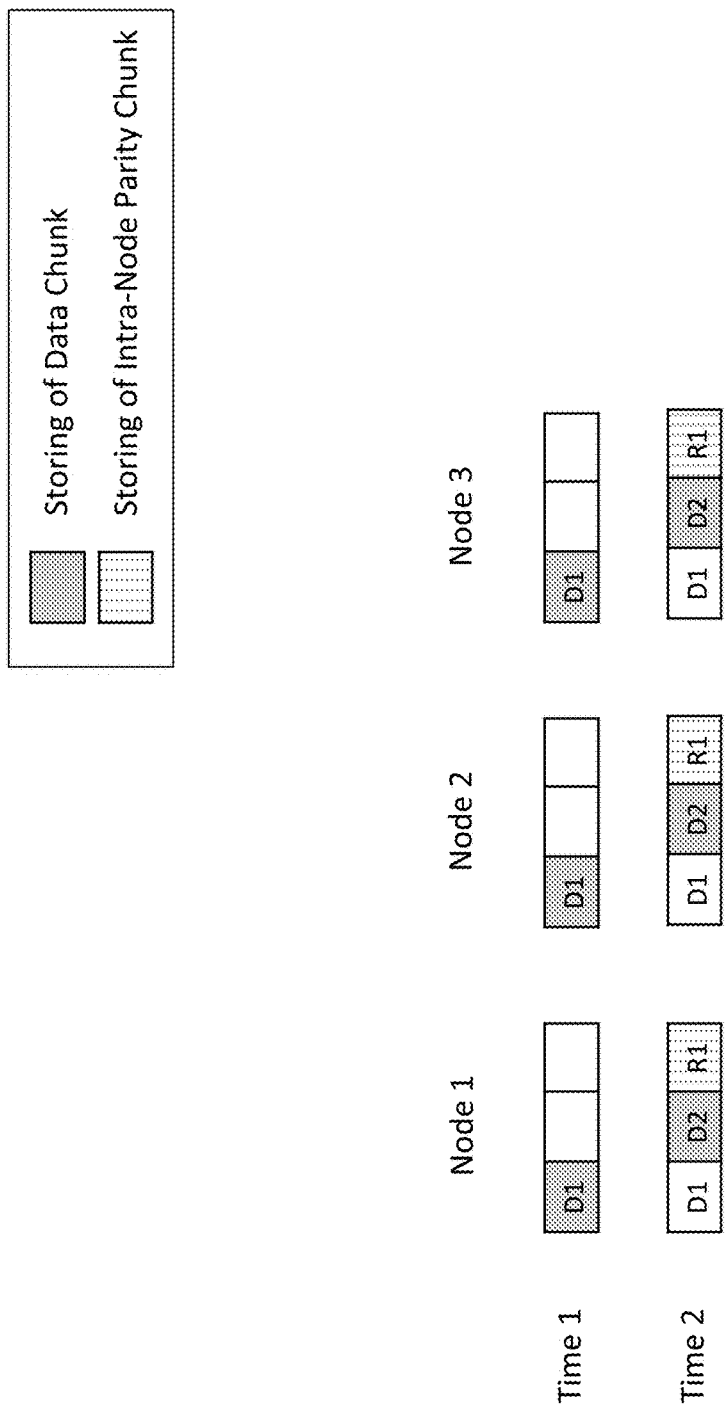
FIG. 12 depicts the example storing of a stripe in the example distributed storage system of FIG. 5, in which intra-node parity chunks may be stored asynchronously (e.g., following the storing of all data chunks belonging to a stripe).

FIG. 12 depicts an example storing process of a stripe in the distributed storage system depicted in FIG. 5, in which intra-node parity chunks may be stored asynchronously (e.g., following the storing of all data chunks belonging to the stripe). Initially, while data chunks of the stripe are being stored, read efficiency may be reduced for improved write efficiency. In this initial period when intra-node parity may not be stored, any data recovery will include the reading of data chunks from a neighboring node, which may incur a greater network penalty (i.e., more network hops) than if the data chunks could be recovered locally using intra-node parity. However, the writing of data during this initial period may be more efficient as no intra-node parity chunks need to be computed and stored.

As shown in FIG. 12, data chunk D1 of the stripe may be stored at a first time instance (or first time period) on each of the nodes. In an asynchronous write of intra-node parity chunks, no intra-node parity chunks may be stored. At the second time instance, data chunk D2 of the stripe may be stored on each of the nodes, resulting in all of the data chunks of the stripe being stored on the distributed storage system. In response to all of the data chunks of the stripe being stored, intra-node parity chunk R1 may also be stored on each of the nodes at the second time instance. Intra-node parity chunk R1 may provide data redundancy for data chunks D1 and D2. In summary, the writing procedure described with respect to FIG. 12 with asynchronous intra-node parity included the writing of three intra-node parity chunks (for the sequential writing of two data chunks). In comparison with the writing procedure depicted in FIG. 11, the writing procedure depicted in FIG. 12 may provide a 50% reduction in the writing of intra-node parity chunks (calculated as 3 fewer intra-node parity chunks divided by 6 original intra-node parity chunks). Again, such efficiency may especially be beneficial if SSDs are used to store data, as the write amplification will be reduced.

Figure 13:
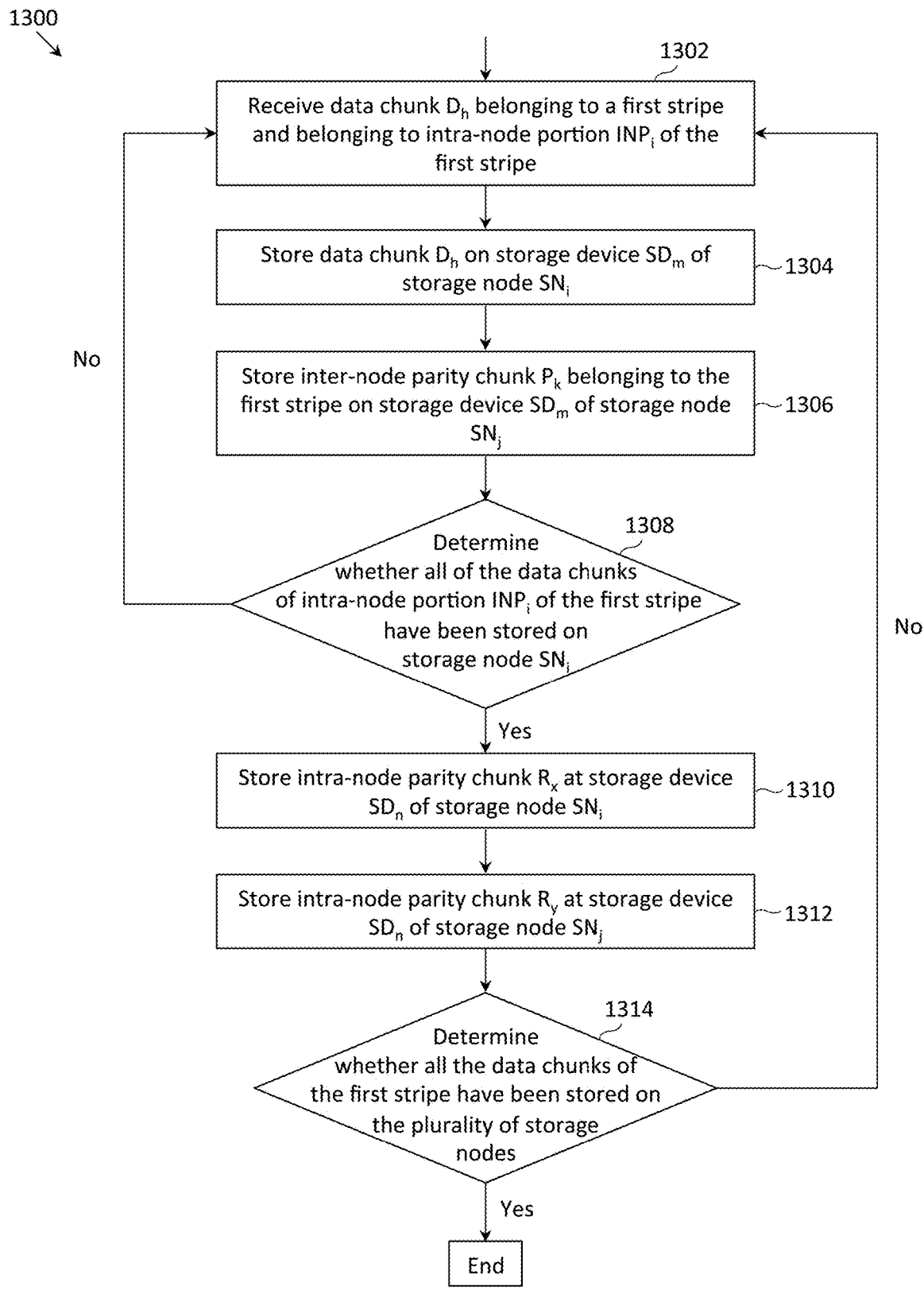
FIG. 13 depicts an example flowchart of a process to store data in the distributed storage system of FIG. 4, in which inter-node parity chunks may be stored synchronously and intra-node parity chunks may be stored asynchronously (e.g., following the storing of all data chunks belonging to an intra-node portion of a stripe), in accordance with one embodiment.

FIG. 13 depicts a flowchart 1300 of an example process to store a stripe in the distributed storage system depicted in FIG. 4, in which inter-node parity chunks may be stored synchronously and intra-node parity chunks may be stored asynchronously (e.g., following the storing of all data chunks belonging to an intra-node portion of the stripe).

At block 1302, data chunk $D_h$ belonging to a first stripe and belonging intra-node portion $INP_i$ of the first stripe may be received. Block 1302 may be illustrated at Time 1 of FIG. 7, during which data chunk D1 was received. Data chunk D1 further belongs to intra-node portion 702a.

At block 1304, data chunk $D_h$ may be stored on storage device $SD_m$ of storage node $SN_i$ (in which intra-node portion $INP_i$ is being stored on storage node $SN_i$). Block 1304 may be illustrated at Time 1 of FIG. 7, during which data chunk D1 was stored on storage device 204a of node 1 (in which the reference numerals of FIG. 3 may be used in the context of FIG. 7).

At block 1306, inter-node parity chunk $P_k$ belonging to the stripe may be stored on storage device $SD_m$ of storage node $SN_j$. Block 1306 may be illustrated at Time 1 of FIG. 7, during which inter-node parity chunk P1 was stored on storage device 204a of node 4. Inter-node parity chunk $P_k$ may provide data redundancy for at least data chunk $D_h$. As previously discussed, inter-node parity chunk $P_k$ may include metadata that records the storage nodes for which the inter-node parity chunk provides data protection. At Time 1 of FIG. 7, the metadata of inter-node parity chunk P1 would record storage node 1. While not depicted in FIG. 13, it may be understood that block 1306 may be repeated in order to store additional inter-node parity chunks (e.g., Q1).

At block 1308, a determination may be made (e.g., by storage node controller 202 of node 1) as to whether all of the data chunks of intra-node portion $INP_i$ of the first stripe have been stored on storage node $SN_i$. At Times 1-3 of FIG. 7, the condition of block 1308 would evaluate to false. For example, at Time 1 of FIG. 7, data chunk D2 had not yet been stored on node 1, so not all of the data chunks of intra-node portion 702a had yet been stored. In response to the condition of block 1308 evaluating to false, the process may return to block 1302, during which another data chunk belonging to the first stripe and belonging to another (or the same) intra-node portion of the first stripe may be received. It may be noted that the numbers represented by the subscripts h, i, j, k, m, n, x and y may be the same or different for each traversal through flowchart 1300.

If the condition of block 1308 evaluates to true, intra-node parity chunk $R_x$ may be stored at storage device $SD_n$ of the storage node $SN_i$ to provide data redundancy for the data chunks stored on storage node $SN_i$ (block 1310). At Times 4-6 of FIG. 7, the condition of block 1308 would evaluate to true. For example, at Time 4 of FIG. 7, all the data chunks (i.e., D1 and D4) of intra-node portion 702a had been stored on node 1. Therefore, at Time 4 of FIG. 7, intra-node parity chunk R1 was stored at storage device 204c of node 1, providing data redundancy for data chunks D1 and D4. More generally, it may be possible to condition the storing of an intra-node parity chunk upon a percentage (e.g., 50%, 75%, 90%) of the data chunks of the intra-node portion $INP_i$ of the first stripe being stored on storage node $SN_i$.

At block 1312, intra-node parity chunk $R_y$ may be stored at storage device $SD_n$ of the storage node $SN_j$ to provide data redundancy for the inter-node parity chunks stored on storage node $SN_j$. Block 1312 may be illustrated at Time 4 of FIG. 7, during which intra-node parity chunk R2 was stored at storage device 204c of node 4, providing data redundancy for inter-node parity chunks P3 and P4. While not depicted in FIG. 13, it may be understood that block 1312 may be repeated in order to store additional intra-node parity chunks (e.g., R3).

At block 1314, a determination may be made (e.g., by storage system controller 108) as to whether all the data chunks of the first stripe have been stored on the plurality of storage nodes. If so, the writing of the first stripe concludes. Otherwise, the process may return to block 1302. In the example of FIG. 7, the condition of block 1314 would evaluate to true at Time 6, but would evaluate to false at Times 1-5. It may further be understood that the process depicted in FIG. 13 may be repeated for storing additional stripes.

Figure 14:
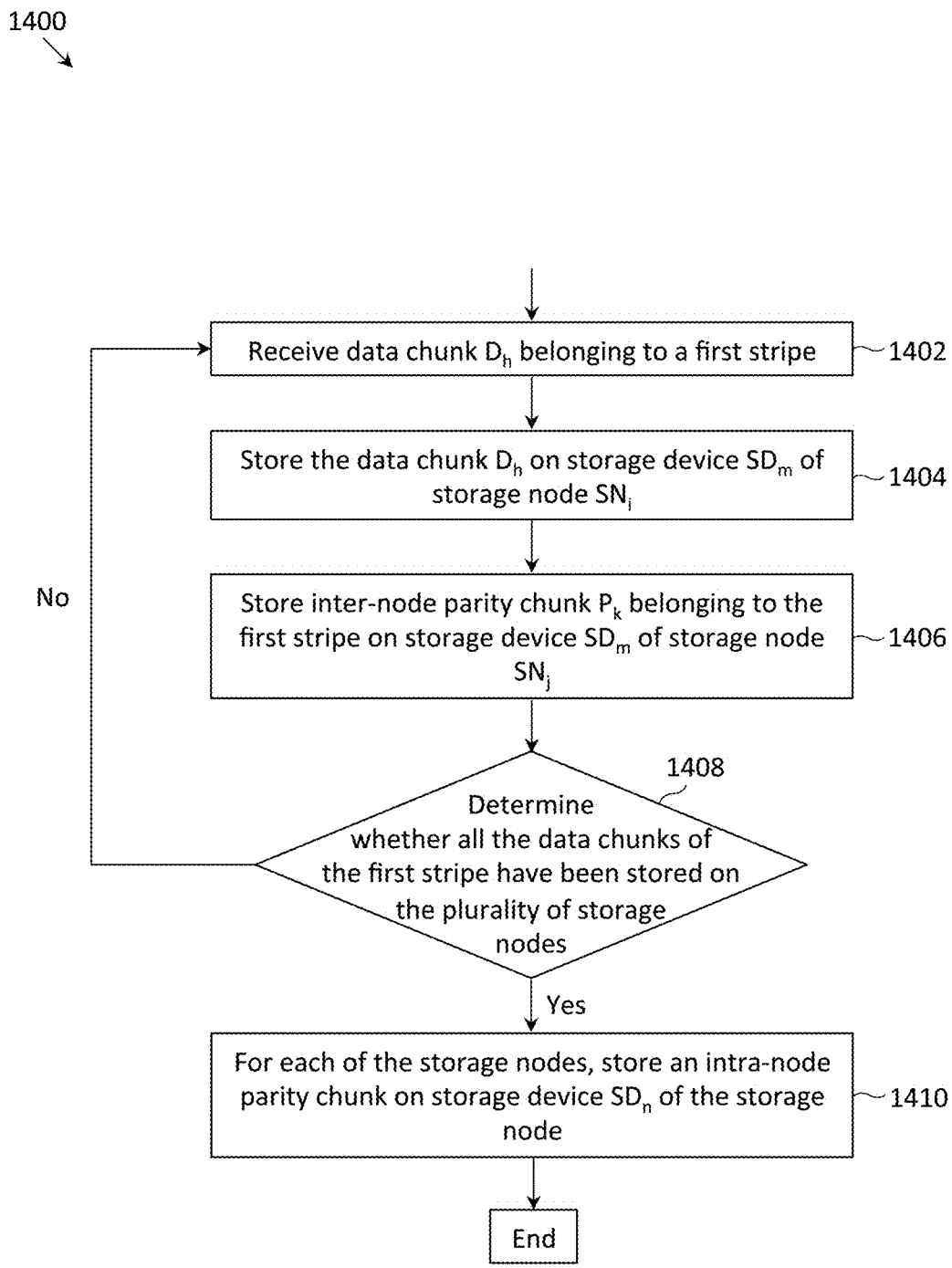
FIG. 14 depicts an example flowchart of a process to store data in the distributed storage system of FIG. 4, in which inter-node parity chunks may be stored synchronously and intra-node parity chunks may be stored asynchronously (e.g., following the storing of all data chunks belonging to a stripe).

FIG. 14 depicts a flowchart 1400 of an example process to store a stripe in the distributed storage system depicted in FIG. 4, in which inter-node parity chunks may be stored synchronously and intra-node parity chunks may be stored asynchronously (e.g., following the storing of all data chunks belonging to the stripe).

At block 1402, data chunk $D_h$ belonging to a first stripe may be received. Block 1402 may be illustrated at Time 1 of FIG. 8, during which data chunk D1 was received.

At block 1404, data chunk $D_h$ may be stored on storage device $SD_m$ of storage node $SN_i$. Block 1404 may be illustrated at Time 1 of FIG. 7, during which data chunk D1 was stored on storage device 204a of node 1 (in which the reference numerals of FIG. 3 may be used in the context of FIG. 8).

At block 1406, inter-node parity chunk $P_k$ belonging to the stripe may be stored on storage device $SD_m$ of storage node $SN_j$. Block 1406 may be illustrated at Time 1 of FIG. 8, during which inter-node parity chunk P1 was stored on storage device 204a of node 4. Inter-node parity chunk $P_k$ may provide data redundancy for at least data chunk $D_h$. As previously discussed, inter-node parity chunk $P_k$ may include metadata that records the storage nodes for which the inter-node parity chunk provides data protection. At Time 1 of FIG. 8, the metadata of inter-node parity chunk P1 would record storage node 1. While not depicted in FIG. 14, it may be understood that block 1406 may be repeated in order to store additional inter-node parity chunks (e.g., Q1).

At block 1408, a determination may be made (e.g., by storage system controller 108) as to whether all the data chunks of the first stripe have been stored on the plurality of storage nodes. If so, for each of the storage nodes, an intra-node parity chunk may be stored on storage device $SD_n$ of the storage node (block 1410). Otherwise, the process may return to block 1402. It may be noted that the numbers represented by the subscripts h, i, j, k, m and n may be the same or different for each traversal through flowchart 1400. In the example of FIG. 8, the condition of block 1408 would evaluate to true at Time 6, but would evaluate to false at Times 1-5. More generally, it may be possible to condition the storing of intra-node parity chunks upon a percentage (e.g., 50%, 75%, 90%) of the data chunks of the first stripe being stored on the plurality of storage nodes.

Block 1410 may be illustrated at Time 6 of FIG. 8, during which intra-node parity chunks R1-R5 may be stored at nodes 1-5, respectively. Intra-node parity chunk R1 may provide data protection for data chunks D1 and D4; intra-node parity chunk R2 may provide data protection for data chunks D2 and D5; intra-node parity chunk R3 may provide data protection for data chunks D3 and D6; intra-node parity chunk R4 may provide data protection for inter-node parity chunks P3 and P6; and intra-node parity chunk R5 may provide data protection for inter-node parity chunks Q3 and Q6. It may further be understood that the process depicted in FIG. 14 may be repeated for storing additional stripes.

Figure 15:
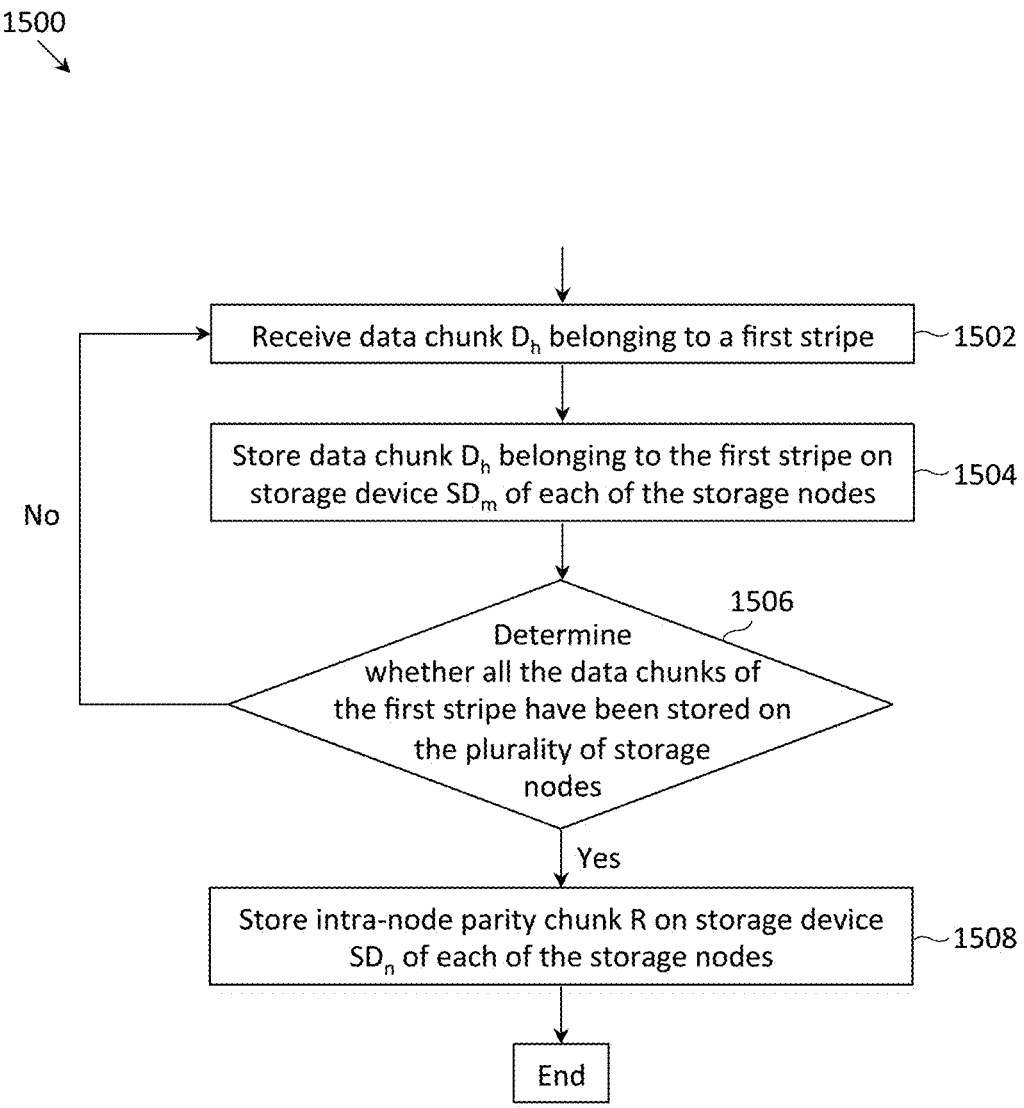
FIG. 15 depicts an example flowchart of a process to store data in the distributed storage system of FIG. 5, in which intra-node parity chunks may be stored asynchronously (e.g., following the storing of all data chunks belonging to a stripe).

FIG. 15 depicts a flowchart 1500 of an example process to store a stripe in the distributed storage system depicted in FIG. 5, in which intra-node parity chunks may be stored asynchronously (e.g., following the storing of all data chunks belonging to the stripe).

At block 1502, data chunk $D_h$ belonging to a first stripe may be received. Block 1502 may be illustrated at Time 1 of FIG. 12, during which data chunk D1 was received.

At block 1504, data chunk $D_h$ may be stored on storage device $SD_m$ of each of the storage node. Block 1504 may be illustrated at Time 1 of FIG. 12, during which data chunk D1 was stored on storage device 204a of each of nodes 1-3 (in which the reference numerals of FIG. 3 may be used in the context of FIG. 12).

At block 1506, a determination may be made (e.g., by storage system controller 108) as to whether all the data chunks of the first stripe have been stored on the plurality of storage nodes. If so, for each of the storage nodes, intra-node parity chunk R may be stored on storage device $SD_n$ of each of the storage nodes (block 1508). Otherwise, the process may return to block 1502. It may be noted that the numbers represented by the subscripts h, m and n may be the same or different for each traversal through the flowchart 1500. In the example of FIG. 12, the condition of block 1506 would evaluate to true at Time 2, but would evaluate to false at Time 1. More generally, it may be possible to condition the storing of intra-node parity chunks upon a percentage (e.g., 50%, 75%, 90%) of the data chunks of the first stripe being stored on the plurality of storage nodes.

Block 1508 is illustrated at Time 2 of FIG. 12 in which intra-node parity chunk R1 may be stored at storage device 204c of nodes 1-3. Intra-node parity chunk R1 may provide data protection for data chunks D1 and D2. It may further be understood that the process depicted in FIG. 15 may be repeated for storing additional stripes.

Figure 16:
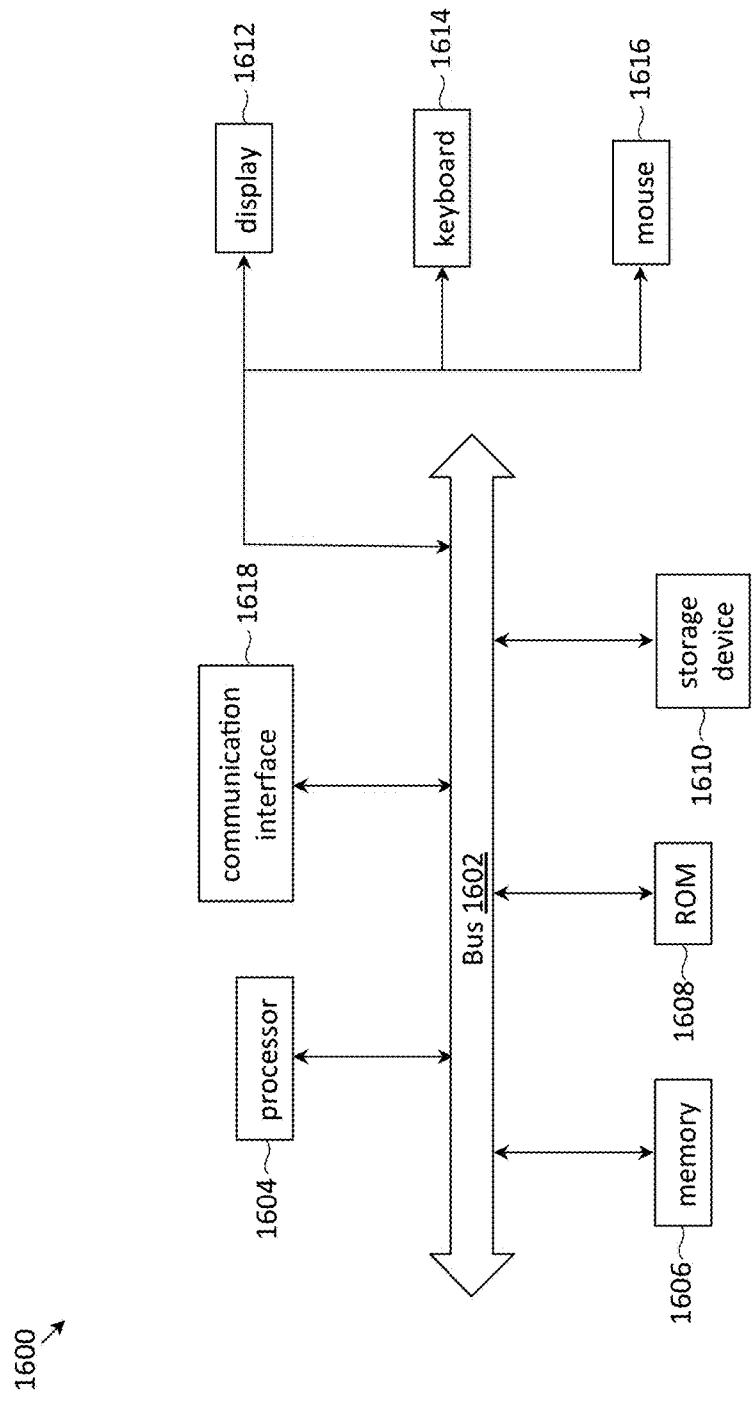
FIG. 16 depicts components of an example computer system in which computer readable instructions instantiating the methods of the present disclosure may be stored and executed.

FIG. 16 depicts an example system 1600 that may be representative of any of the host 102, the storage system controller 108, the storage nodes 112a-112e, the storage node controller 202, and the storage devices 204a-204d discussed above. Note, not all of the various processor-based systems that may be employed in accordance with examples of the present invention have all of the features of system 1600. For example, certain processor-based systems may not include a display inasmuch as the display function may be provided by a client computer communicatively coupled to the processor-based system or a display function may be unnecessary. Such details may not be critical to the present disclosure.

The system 1600 may include a bus 1602 or other communication mechanism for communicating information, and a processor 1604 coupled with the bus 1602 for processing information. The system 1600 may also include a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The system 1600 may further include a read only memory (ROM) 1608 or other static storage device coupled to the bus 1602 for storing static information and instructions for the processor 1604. A storage device 1610, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 604 may read, may be provided and coupled to the bus 1602 for storing information and instructions (e.g., operating systems, applications programs and the like).

The system 1600 may be coupled via the bus 1602 to a display 1612, such as a flat panel display, for displaying information to a user. An input device 1614, such as a keyboard including alphanumeric and other keys, may be coupled to the bus 1602 for communicating information and command selections to the processor 1604. Another type of user input device is a cursor control device 1616, such as a mouse, a trackball, or cursor direction keys for communicating direction information and command selections to the processor 1604 and for controlling cursor movement on the display 1612. Other user interface devices, such as microphones, speakers, etc., are not shown in detail but may be involved with the receipt of user input and/or presentation of output.

The processor 1604 may implement the processes referred to herein by executing appropriate sequences of processor-readable instructions stored in the main memory 1606. Such instructions may be read into the main memory 1606 from another processor-readable medium, such as the storage device 1610, and execution of the sequences of instructions contained in the main memory 1606 may cause the processor 1604 to perform the associated actions. In alternative examples, hard-wired circuitry or firmware-controlled processing units (e.g., field programmable gate arrays) may be used in place of or in combination with the processor 1604 and its associated computer software instructions to implement features of the present disclosure. The processor-readable instructions may be rendered in any computer language.

The system 1600 may also include a communication interface 1618 coupled to the bus 1602. The communication interface 1618 may provide a two-way data communication channel with a computer network, which may provide connectivity to the systems discussed above. For example, the communication interface 1618 may be a local area network (LAN) card to provide a data communication connection to a compatible LAN, which itself may communicatively be coupled to other computer systems. The precise details of such communication paths may not critical to the present disclosure. It should be noted that the system 1600 may send and receive messages and data through the communication interface 1618 and in that way communicate with other controllers, etc.

Thus, methods and systems for efficiently storing data in a distributed storage system have been described. It may be understood that the above-description is intended to be illustrative, and not restrictive. Many other examples will be apparent to those of skill in the art upon reviewing the above description. The scope of the present disclosure should, therefore, be determined with reference to the appended claims, along with the full scope of equivalents to which such claims may be entitled.

What is claimed is:

1. A method comprising:
   storing, by a processor, a first data chunk belonging to a stripe on a first storage device of a plurality of storage devices of a first storage node of a plurality of storage nodes, wherein the stripe is to be stored across the plurality of storage nodes in a plurality of intra-node portions, including a first intra-node portion to be stored on the first storage node and that comprises a plurality of data chunks including the first data chunk;

before all of the data chunks of the first intra-node portion have been stored on the first storage node:

storing a first inter-node parity chunk on a storage device of a second storage node of the plurality of storage nodes, wherein the first inter-node parity chunk is determined from at least the first data chunk; and delaying storage of a first intra-node parity chunk at the first storage node; determining whether all of the data chunks of the first intra-node portion of the stripe have been stored on the first storage node; and when all of the data chunks of the first intra-node portion of the stripe have been stored on the first storage node, storing the first intra-node parity chunk at a second one of the storage devices of the first storage node, wherein the first intra-node parity chunk is determined from at least one of the data chunks of the first intra-node portion of the stripe.

2. The method of claim 1, comprising: storing the stripe across the plurality of storage nodes in a redundant manner using erasure coding.

3. The method of claim 1, comprising:
storing the plurality of intra-node portions of the stripe on respective storage nodes of the plurality of storage nodes, including storing the first intra-node portion on the first storage node.

4. The method of claim 3, wherein, for each of one or more of the plurality of intra-node portions, the intra-node portion comprises a plurality of data chunks and at least one intra-node parity chunk, the first intra-node portion comprising the first intra-node parity chunk.

5. The method of claim 4, wherein at least one of the plurality of intra-node portions comprises at least one inter-node parity chunk and at least one intra-node parity chunk determined from at least the at least one inter-node parity chunk of the intra-node portion, the intra-node portion stored on the second storage node comprising the first inter-node parity chunk.

6. The method of claim 5, wherein:
each of the plurality of storage nodes comprises a respective plurality of storage devices; and
for each of the plurality of intra-node portions stored on respective storage nodes of the plurality of storage nodes, each chunk of the intra-node portion in stored on a different storage device of the respective storage node.

7. The method of claim 5, comprising:
storing inter-node parity chunks synchronously relative to the storage of respective data chunks of the stripe; and
storing inter-node parity chunks asynchronously relative to the storage of respective data chunks of the stripe.

8. A non-transitory storage medium comprising instructions executable by a processor of a storage system controller to:

store a first data chunk belonging to a stripe on a first storage device of a plurality of storage devices of a first storage node of a plurality of storage nodes, wherein the stripe is to be stored across the plurality of storage nodes in a plurality of intra-node portions, including a first intra-node portions to be stored on the first storage node and that comprises a plurality of data chunks including the first data chunk;

before a threshold amount of the data chunks of the first intra-node portion have been stored on the first storage node:

store a first inter-node parity chunk on a storage device of a second storage node of the plurality of storage nodes, wherein the first inter-node parity chunk to determined from at least the first data chunk; and delay storage of a first intra-node parity chunk at the first storage node; determine whether the threshold amount of the data chunks of the first intra-node portion of the stripe have been stored on the first storage node; and when the threshold amount of the data chunks of the first intra-node portion of the stripe have been stored on the first storage node, store the first intra-node parity chunk at a second one of the storage devices of the first storage node, wherein the first intra-node parity chunk is determined from at least one of the data chunks of the first intra-node portion of the stripe.

9. The storage medium of claim 8, wherein the threshold amount of the data chunks of the first intra-node portion of the stripe is all of the data chunks of the first intra-node portion.

10. The storage medium of claim 8, wherein the threshold amount of the data chunks of the first intra-node portion of the stripe is less than all of the data chunks of the first intra-node portion.

11. The storage medium of claim 8, wherein the threshold amount of the data chunks of the first intra-node portion of the stripe is one of 50 percent, 75 percent, and 90 percent of the data chunks of the first intra-node portion.

12. The storage medium of claim 8, the instructions comprising instructions to:
store the plurality of intra-node portions of the stripe on respective storage nodes of the plurality of storage nodes, including storing the first intra-node portion on the first storage node.

13. The storage medium of claim 12, wherein, for each of one or more of the plurality of intra-node portions, the intra-node portion comprises a plurality of data chunks and at least one intra-node parity chunk, the first intra-node portion comprising the first intra-node parity chunk.

14. The storage medium of claim 13, wherein at least one of the plurality of intra-node portions comprises at least one inter-node parity chunk and at least one intra-node parity chunk determined from at least the at least one inter-node parity chunk of the intra-node portion, the intra-node portion stored on the second storage node comprising the first inter-node parity chunk.

15. The storage medium of claim 14, the instructions comprising instructions to:
store inter-node parity chunks synchronously relative to the storage of respective data chunks of the stripe; and
store inter-node parity chunks asynchronously relative to the storage of respective data chunks of the stripe.

16. A storage system controller comprising:
a processor; and
a non-transitory storage medium comprising instructions executable by the processor to:
store a first data chunk belonging to a stripe on a first storage device of a plurality of storage devices of a first storage node of a plurality of storage nodes, wherein the stripe is to be stored across the plurality of storage nodes in a plurality of intra-node portions, including a first intra-node portion to be stored on the first storage node and that comprises a plurality of data chunks including the first data chunk;

before a threshold amount of the data chunks of the first intra-node portion have been stored on the first storage node:
store a first inter-node parity chunk on a storage device of a second storage node of the plurality of storage nodes, wherein the first inter-node parity chunk is determined from at least the first data chunk; and
delay storage of a first intra-node parity chunk at the first storage node; determine whether the threshold amount of the data chunks of the first intra-node portion of the stripe have been stored on the first storage node; and
when the threshold amount of the data chunks of the first intra-node portion of the stripe have been stored on the first storage node, store the first intra-node parity chunk at a second one of the storage devices of the first storage node, wherein the first intra-node parity chunk is determined from at least one of the data chunks of the first intra-node portion of the stripe.

17. The storage system controller of claim 16, wherein the threshold amount of the data chunks of the first intra-node portion of the stripe is all of the data chunks of the first intra-node portion.

18. The storage system controller of claim 16, wherein the threshold amount of the data chunks of the first intra-node portion of the stripe is less than all of the data chunks of the first intra-node portion.

19. The storage system controller of claim 16, the instructions comprising instructions to:
store the plurality of intra-node portions of the stripe on respective storage nodes of the plurality of storage nodes, including storing the first intra-node portion on the first storage node.

20. The storage system controller of claim 19, wherein, for each of one or more of the plurality of intra-node portions, the intra-node portion comprises a plurality of data chunks and at least one intra-node parity chunk, the first intra-node portion comprising the first intra-node parity chunk.

* * * * *